United States Patent
Ghosh et al.

(10) Patent No.: US 11,287,865 B2
(45) Date of Patent: Mar. 29, 2022

(54) USB HUB WITH INTEGRATED POWER AND THERMAL MANAGEMENT

(71) Applicant: Microchip Technology Incorporated, Chandler, AZ (US)

(72) Inventors: Atish Ghosh, Austin, TX (US); Venkatha Supramanian Kunjidabadam, Kandanchavady (IN); Sandhya Asokan, Tamilnadu (IN); Hari Kishore Rajendran, Tamil Nadu (IN)

(73) Assignee: Microchip Technology Incorporated, Chandler, AZ (US)

( * ) Notice: Subject to any disclaimer, the term of this patent is extended or adjusted under 35 U.S.C. 154(b) by 56 days.

(21) Appl. No.: 16/745,680

(22) Filed: Jan. 17, 2020

(65) Prior Publication Data

US 2020/0393885 A1 Dec. 17, 2020

(51) Int. Cl.
  *G06F 1/26* (2006.01)
  *G06F 1/32* (2019.01)
  *G06F 1/3296* (2019.01)
  *G06F 1/28* (2006.01)
  *G06F 1/3215* (2019.01)

(52) U.S. Cl.
  CPC .............. *G06F 1/266* (2013.01); *G06F 1/28* (2013.01); *G06F 1/3215* (2013.01); *G06F 1/3296* (2013.01)

(58) Field of Classification Search
  CPC ...................................................... G06F 1/266
  See application file for complete search history.

(56) References Cited

U.S. PATENT DOCUMENTS

| 2009/0100275 | A1 | 4/2009 | Chang et al. ................. 713/300 |
| 2013/0311793 | A1 | 11/2013 | Chang ............................ 713/300 |
| 2016/0139642 | A1* | 5/2016 | Hijazi .................... G06F 1/1632 361/679.31 |
| 2017/0293334 | A1* | 10/2017 | Pelissier .................... G06F 1/32 |
| 2019/0064914 | A1* | 2/2019 | Krishnakumar ...... H02J 7/0068 |
| 2019/0087295 | A1* | 3/2019 | Sultenfuss .............. G06F 1/263 |
| 2019/0094937 | A1 | 3/2019 | Sultenfuss et al. |
| 2019/0250689 | A1* | 8/2019 | Ivanov ...................... H02J 1/14 |

FOREIGN PATENT DOCUMENTS

EP  2843795 A1  3/2015  ............... H02J 7/00

OTHER PUBLICATIONS

International Search Report and Written Opinion, Application No. PCT/US2020/037383, 13 pages, dated Aug. 31, 2020.

* cited by examiner

*Primary Examiner* — Mohammed H Rehman
(74) *Attorney, Agent, or Firm* — Slayden Grubert Beard PLLC

(57) ABSTRACT

A universal serial bus (USB) dock includes USB ports, each configured to connect to a respective USB element. The USB dock includes a circuit communicatively coupled to the USB ports and configured to determine a first temperature measurement in the USB dock, determine a power demand for each USB element connected to the USB ports, determine an allocation of power for the USB elements, and, based on the first allocation of power, provide less than the power demand for one or more of the USB elements based upon a total power demand by the USB elements and the first temperature measurement.

14 Claims, 6 Drawing Sheets

USB HUB WITH INTEGRATED POWER AND THERMAL MANAGEMENT

PRIORITY

This application claims priority to Indian Provisional Patent Application Serial number 201911023635, filed Jun. 14, 2019, the contents of which are hereby incorporated in their entirety.

TECHNICAL FIELD

The present disclosure relates to universal serial bus (USB) and, more particularly, to a USB hub with integrated power and thermal management.

BACKGROUND

USB power delivery (PD) is a protocol that allows any USB device with a type C connector to request power from a USB dock or host at programmable voltages and currents. For example, fixed voltage systems allow the USB device to request voltages of 5 V, 9 V, 15 V and 20 V. A USB device might negotiate, upon connecting to a USB dock or host, up to 5 amps of current. Consequently, the USB device can request up to 100 watts per port. For a USB docking station with four downstream ports, up to 400 W of power may be required. Some devices that are typically plugged into a USB dock include a mouse and keyboard, which require a few watts each. A mouse or keyboard that is plugged into a 100 W capable port cannot make use of the full amount of available power, and the available power is wasted. Furthermore, if 400 W of power is specified as available for a given USB hub or dock, this may present significant thermal issues, particularly as the USB hub or dock may be implemented in a small enclosure with limited cooling.

SUMMARY

Embodiments of the present disclosure include an apparatus such as a USB dock or USB hub includes USB ports, wherein each port is configured to connect to a respective USB element. The USB element may be configured as a USB host or a USB device. The apparatus includes a circuit communicatively coupled to the USB ports. The circuit may be configured to determine a temperature measurement in the apparatus, determine a power demand for each USB element connected to the USB ports, determine an allocation of power for the USB elements, and based on the allocation of power, provide less than the power demand for one or more of the USB elements based upon a total power demand by the USB elements and the temperature measurement.

Embodiments of the present disclosure include a non-transitory machine-readable medium. The medium may include instructions. The instructions, when loaded and executed by a processor, cause the processor to determine a temperature measurement in an apparatus such as a USB hub or USB dock, determine a power demand for each USB element connected to the USB ports of the USB hub or USB dock, determine an allocation of power for the USB elements, and based on the allocation of power, provide less than the power demand for one or more of the USB elements based upon a total power demand by the USB elements and the temperature measurement.

Embodiments of the present disclosure include a method. The method may include determining a temperature measurement in an apparatus such as a USB hub or USB dock, determining a power demand for each USB element connected to the USB ports of the USB hub or USB dock, determining an allocation of power for the USB elements, and based on the allocation of power, providing less than the power demand for one or more of the USB elements based upon a total power demand by the USB elements and the temperature measurement.

DETAILED DESCRIPTION

Figure 1:
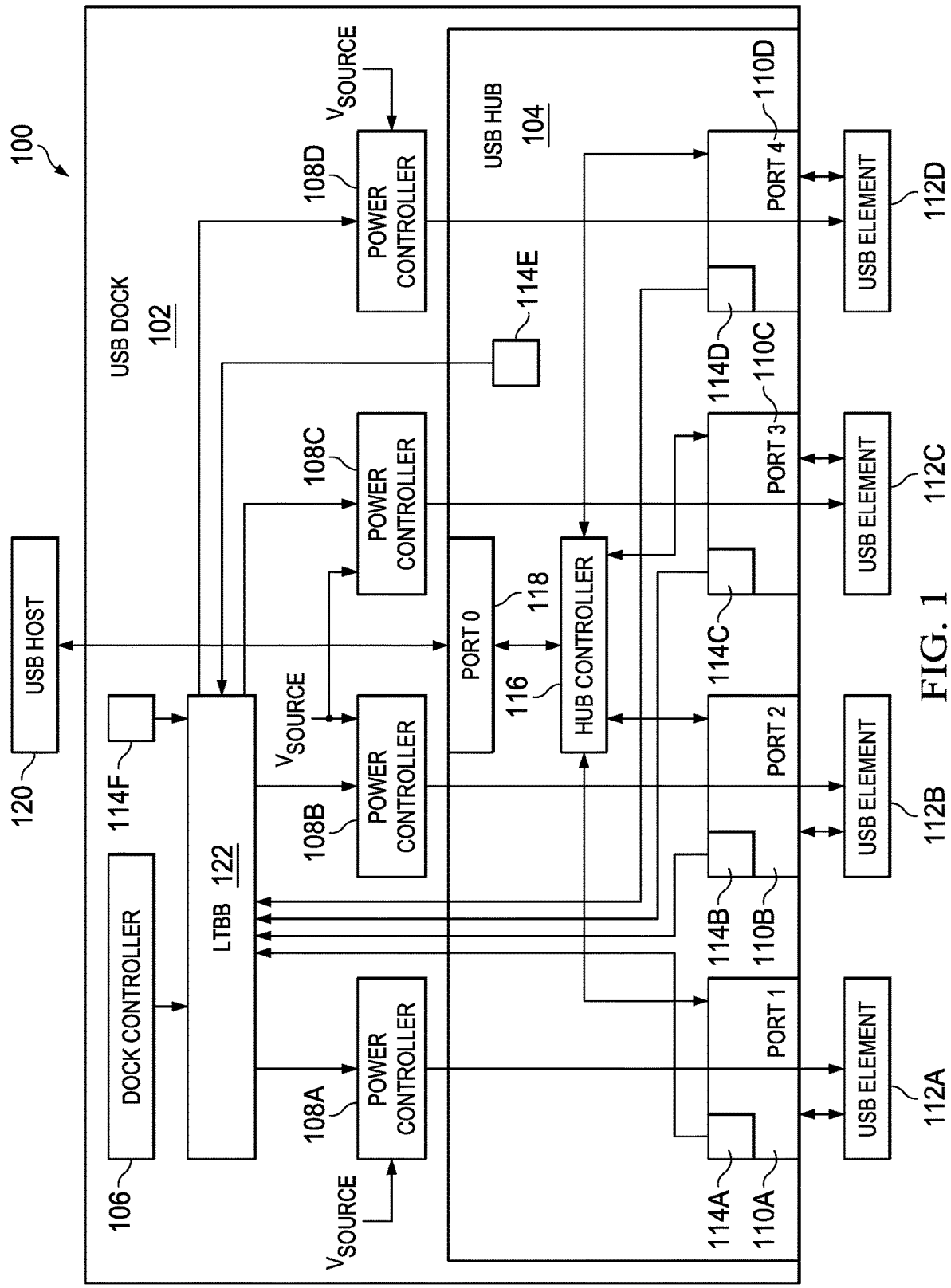
FIG. 1 is an illustration of an example system with integrated power and thermal management for USB, according to embodiments of the present disclosure.

Embodiments of the present disclosure may include an apparatus. The apparatus may include a USB dock or a USB hub. The USB dock may include the USB hub. The USB hub may be configured to provide bridging between USB elements connected to the apparatus. The apparatus may include USB ports each configured to connect to a respective USB element. The USB elements may be configured as USB hosts or USB devices. The apparatus may include a circuit. The circuit may be communicatively coupled to the USB ports. Moreover, the circuit may be communicatively coupled to controller circuits for the USB dock or USB hub. The circuit may be configured to determine a first temperature measurement in the apparatus. The first temperature measurement may be of a USB port, within the apparatus housing generally, on a chip or board of the USB hub or USB dock, or otherwise within the USB hub or USB dock. The circuit may be configured to determine a power demand for each USB element connected to the USB ports. The power demand may be determined by a request from the USB element and a subsequent negotiation with the apparatus. The negotiation may include evaluating the request from the USB element, requests from other USB elements, and available power. The circuit may be configured to determine a first allocation of power for the USB elements based upon the negotiation. The circuit may be configured to, based on the first allocation of power, provide less than the power demand for one or more of the USB elements based upon a total power demand by the USB elements and the first temperature measurement. The circuit may be implemented by analog circuitry, digital circuitry, instructions for execution by a processor, or any suitable combination thereof.

In combination with any of the above embodiments, the first allocation of power may provide less than the power demand for a given USB element when the first temperature measurement is for the given USB element and is above a certain range. In combination with any of the above embodiments, the first allocation of power may provide less than the power demand for all the USBs element when the first temperature measurement is for the apparatus, USB hub, USB dock and is above a certain range. In combination with any of the above embodiments, the first allocation of power may provide less than the power demand with a reduced absolute amount or quantification of power when the first temperature measurement is above a certain range. In combination with any of the above embodiments, the first allocation of power may provide less than the power demand with a reduced percentage of power when the first temperature measurement is above a certain range.

In combination with any of the above embodiments, the amount of power reduced may be dependent upon whether the first temperature measurement has reached one of a plurality of thresholds. In combination with any of the above embodiments, as the first temperature reaches a first threshold, the power may be reduced by a certain amount. As the first temperature reaches a second, higher threshold, the power may be reduced by a further amount.

In combination with any of the above embodiments, the first allocation of power may be derived from an initial allocation of power. The first allocation of power may be derived by considering the power demands of newly attached USB elements in view of the initial allocation power for the already attached USB elements.

In combination with any of the above embodiments, the circuit may be further configured to determine the initial allocation of power for each USB element based upon an aggregate power demand of all of the USB elements connected to the USB ports, and modify the initial allocation of power to yield the first allocation of power to reduce the initial allocation of power for one or more USB elements based upon the newly attached USB element. Furthermore, the initial allocation of power may be reduced based upon the first temperature measurement.

In combination with any of the above embodiments, the first temperature measurement may be of the USB hub generally including the USB ports and the circuit is further configured to modify the initial allocation of power to yield the first allocation of power to reduce the initial allocation of power for all of the USB elements based upon the first temperature measurement of the USB hub.

In combination with any of the above embodiments, the first temperature measurement may be of an individual USB port connected to a first USB element and the circuit is further configured to modify the initial allocation of power to yield the first allocation of power to reduce the initial allocation of power for the first USB element based upon the first temperature measurement of the USB port, and maintain the initial allocation of power in the first allocation of power for other USB elements connected to the USB ports.

In combination with any of the above embodiments, the first temperature measurement may be of an individual USB port connected to a first USB element and the circuit is further configured to determine a second temperature measurement of the apparatus, wherein the second temperature measurement is of the USB hub generally including the USB ports. The circuit may be configured to modify the initial allocation of power to yield the first allocation of power to reduce the initial allocation of power for all the USB elements based upon the first temperature measurement of the USB port, the second temperature measurement of the USB hub, and a determination that the second temperature measurement is higher than the first temperature measurement.

In combination with any of the above embodiments, the first temperature measurement is of an individual USB port connected to a first USB element and the circuit is further configured to determine a second temperature measurement of the apparatus, the second temperature measurement of a USB hub generally and including the USB ports, and modify the initial allocation of power to yield the first allocation of power to, based upon the first temperature measurement of the USB port, the second temperature measurement of the USB hub, and a determination that the second temperature measurement is lower than the first temperature measurement, reduce the initial allocation of power for all the USB elements, and further reduce the initial allocation of power for the first USB element.

In combination with any of the above embodiments, the circuit may be further configured to receive user input to provide charging to a first USB element at a level sufficient to charge the first USB element, and modify the first allocation of power to yield a second allocation of power to increase an allocation of power for the first USB element, the second allocation of power for the first USB element including more power than an advertised power availability of the apparatus.

Embodiments of the present disclosure may include an article of manufacture, comprising a non-transitory machine-readable medium, the medium including instructions, the instructions, when loaded and executed by a processor, configure the processor to perform the operations of the circuit of the apparatus of any of the above embodiments.

Embodiments of the present disclosure may include a method performed by any of the circuits, apparatuses, hubs, or docks of the above embodiments.

FIG. 1 is an illustration of an example system 100 with integrated power and thermal management for USB, according to embodiments of the present disclosure. System 100 may be implemented with any suitable context, environment, or application, such as on a network, in a vehicle, or in industrial applications.

In one embodiment, system 100 may include a USB dock 102. USB dock 102 may be implemented by analog circuitry, digital circuitry, instructions for execution by a processor, or in any suitable combination thereof. USB dock 102 may be configured to perform thermal and power load balancing on behalf of system 100. USB dock 102 may in turn be implemented within any suitable context, application, device, or system. For example, USB dock 102 may include a USB hub 104. In another example, USB dock 102 may be communicatively coupled to USB hub 104. USB dock 102 may be configured to charge or provide power to any suitable number and kind of USB elements 112. Four USB elements 112 are shown, individually labeled as 112A, 112B, 112C, 112D. USB dock 102 may provide connections to a USB host 120.

USB hub 104 may be implemented by analog circuitry, digital circuitry, instructions for execution by a processor, or in any suitable combination thereof. USB hub 104 may be configured to facilitate communication between multiple USB elements, such as USB host 120 and USB elements 112. Examples of USB host 120 may include, for example, a laptop, automotive head unit, smart phone, or computer. USB elements 112 may include USB elements configured as USB hosts or USB devices, such as laptops, smart phones, computers, external storage devices, or peripherals. Typically, within a group of USB elements in communication with one another, only one USB element is configured as a USB host while the remaining elements are configured as USB devices. In the example of FIG. 1, USB host 120 may be configured as a USB host and USB elements 112 may be configured as USB devices. Nevertheless, USB hub 104 may be configured to provide host-to-host bridging according to any suitable technique or protocol, wherein at least one of USB elements 112 may be configured as a USB host in addition to USB host 120.

USB dock 102 may include a dock controller circuit 106. USB dock 102 may include a load and thermal balancing block (LTBB) 122. LTBB 122 may be implemented as a part of or separate from dock controller circuit 106. Dock controller circuit 106 and LTBB 122 may be implemented by analog circuitry, digital circuitry, instructions for execution by a processor, firmware, or in any suitable combination thereof. Furthermore, USB hub 104 may include a hub controller circuit 116. Hub controller circuit 116 may be implemented by analog circuitry, digital circuitry, instructions for execution by a processor, or in any suitable combination thereof. Hub controller circuit 116 may be communicatively coupled to dock controller circuit 106. Hub controller circuit 116 may be communicatively coupled to LTBB 122. Dock controller circuit 106 and LTBB 122 may be communicatively coupled.

USB dock 102 may include any suitable number and kind of ports to connect to USB devices or hosts. Such ports may be included within USB hub 104. For example, USB hub 104 may include Port 1 110A, Port 2 110B, Port 3 110C, and Port 4 110D to connect to USB elements 112. An upstream port, Port 0 118, to connect USB hub 104 to a USB host 120 may be implemented in USB hub 104 or USB dock 102. Ports 110 may be typically used as downstream ports, but may be used as downstream and upstream ports if USB hub 104 is configured to perform host to host bridging.

USB dock 102, through LTBB 122, may be configured to provide thermal balancing and power load balancing with respect to the operation of ports 110. USB dock 102 may include temperature sensors 114, such as temperature sensors 114A, 114B, 114C, 114D for respective ones of ports 110A, 110B, 110C, 110D. Temperature sensors 114A, 114B, 114C, 114D may be implemented within or near respective ones of ports 110A, 110B, 110C, 110D. Thus, temperature sensors 114A, 114B, 114C, 114D may be implemented within USB hub 104. USB dock 102 may include a temperature sensor 114F located on a board, semiconductor die, or other platform implementing USB dock 102. Furthermore, USB hub 104 may include a temperature sensor 114E located on a board, semiconductor die, or other platform implementing USB hub 104. Temperature sensors 114 may be communicatively coupled to LTBB 122. LTBB 122 may be configured to gather temperature data from temperature sensors 114. Temperature sensors 114 may be implemented in any suitable manner, such as with thermistors, integrated circuit sensors, or thermocouples.

USB dock 102 may include power controller circuits for each of ports 110A, 110B, 110C, 110D. A single power controller circuit may be used, or USB dock 102 may include power controller circuits 108A, 108B, 108C, 108D for respective ones of ports 110A, 110B, 110C, 110D, as shown. Power controller circuits 108A, 108B, 108C, 108D may be communicatively coupled to respective ports 110A, 110B, 110C, 110D. Power controller circuits 108A, 108B, 108C, 108D may be implemented by analog circuitry, digital circuitry, instructions for execution by a processor, or in any suitable combination thereof. Power controller circuits 108A, 108B, 108C, 108D may be communicatively coupled to LTBB 122. Power controller circuits 108A, 108B, 108C, 108D may configure or set respective ports 110A, 110B, 110C, 110D to use a designated amount of power. Power controller circuits 108A, 108B, 108C, 108D may perform such configurations based upon instructions, commands, data, or control signals received from LTBB 122. Power controller circuits 108A, 108B, 108C, 108D may be configured to receive a designation of available voltage from a voltage source, such as Vsource. Vsource may be provided by any suitable source, such as a power supply, battery, or USB host 120.

LTBB 122 may be configured to receive information, data, commands, or control signals from dock controller circuit 106 or hub controller circuit 116. Dock controller circuit 106 and hub controller 116 may in turn be configured to receive information, data, commands, or control signals from any suitable source, such as user settings, software running elsewhere in system 100, or USB host 120. The connected or disconnected status of each of ports 112, 118, as well as the available power or power requested or required by a USB element attached to that port, may be known to or determined by one or more of HUB controller circuit 116, dock controller circuit 106, and LTBB 122.

Figure 2:
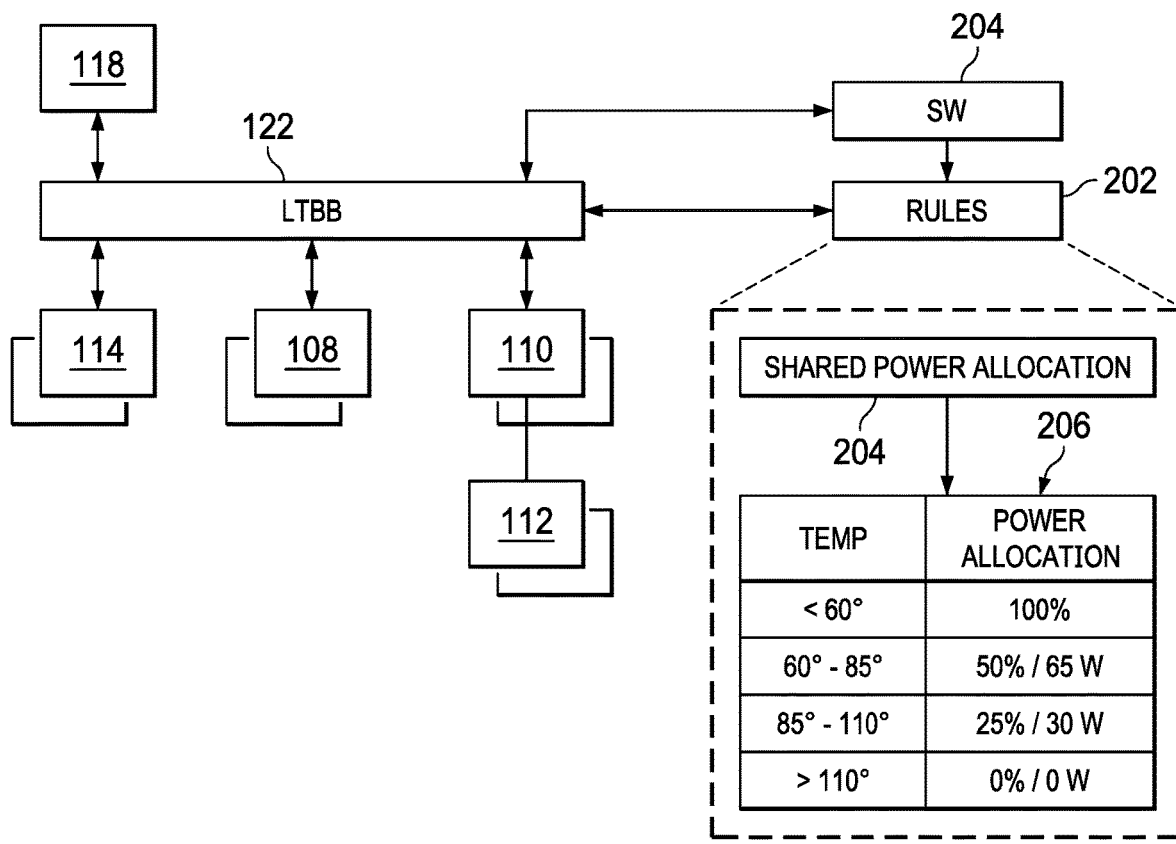
FIG. 2 is more detailed illustration of portions of system with integrated power and thermal management for USB, according to embodiments of the present disclosure.

FIG. 2 is more detailed illustration of portions of system 100 with integrated power and thermal management for USB, according to embodiments of the present disclosure. In particular, FIG. 2 illustrates the operation of LTBB 122 to provide power and thermal management for USB in system 100.

LTBB 122 may be configured to provide power and thermal management for USB based upon any suitable criteria. The criteria may include rules, policies, preferences, or settings, which may be stored in registers, tables, databases, files, or any other suitable data structure. Such criteria are illustrated in FIG. 2 as rules 202. Rules 202 may be updated or amended by LTBB 122, or by software 204. Software 204 may include application software, operating systems, firmware, or any other suitable software. Changes to rules 202 by software 204 may reflect default settings for a user application, default settings for a particular kind or type of USB element, user input to change rules, or any other suitable changes. Rules 202 may be updated or amended by LTBB 122 based upon communication from other portions of system 100 (not shown). The changes to rules 202 may include, for example, changes in threshold values, new logical or predicate bases for enabling or disabling power to USB elements, or priority among rules.

LTBB 122 may receive information about the operation or conditions of system 100 from, for example, temperature sensors 114, power controller circuits 108, ports 110, port 118, or software 204. LTBB 122 may receive data about the temperature of USB elements 112, USB dock 102, or USB hub 104 through temperature sensors 114. LTBB 122 may receive data about the power usage of USB elements 112 or ports 110 from power controller circuits 108. For example, power controller circuits 108 or controllers 106, 116 (not shown) may provide the actual or desired power consumption of USB elements 112. LTBB 122 may receive information about the bandwidth consumption or demands of USB elements from ports 110 or port 118, or controllers 106, 116 (not shown). LTBB 122 may receive information about user input, desired USB performance, or operation of other portions of system 100 from software 204. For example, a status of a vehicle such as turned on or off, a user override, or other information may be received from software 204.

Requests for power may be expressed in any suitable manner or format. For example, a USB element requesting power may express such a request to LTBB in terms of power, voltage, or current. A laptop may request 100 W of power, or, if it includes a 12 V battery, the laptop may request 12 V at a current of an amount equal to the power available divided by 12.

In an example of application of rules 202, USB element 112A may be a laptop with the ability to consume 100 W of power, and may be configurable as a USB host itself. Nevertheless, USB element 112A may itself also be configurable as a USB device. USB element 112A may be configured to receive power when connected to USB hub 104 or USB dock 102 through port 110A. USB element 112A may be able to charge its own batteries fastest when connected with 100 W of power, but may be able to charge its own batteries at a lower rate and otherwise operate in a normal manner when connected with less power, such as 50 W of power. USB element 112A might not be able to charge its batteries, but otherwise operates in a normal manner when connected with 25 W of power based solely on the power received through port 110A. USB element 112A might not be able to use power received through port 110A when connected with 2.5 W of power for its own internal operations or charging its own batteries, but may be able to maintain USB communications with other USB elements connected to USB hub 104 and USB dock 102, or maintain communications with USB hub 104 and USB dock 102 themselves. When connected with less than 25 W of power, USB element 112A might rely upon its own batteries or power source reserves for any power not provided by USB hub 104 and USB dock 102.

USB element 112B may be a smartphone with the ability to use 50 W of power, and may be configurable as a USB host itself. Nevertheless, USB element 112B may itself also be configurable as a USB device. USB element 112B may be configured to receive power from USB hub 104 when connected to USB hub 104 or USB dock 102 through port 110B. USB element 112B may be able to charge its own batteries fastest when connected with 50 W of power, but may be able to charge its own batteries at a normal rate and otherwise operate in a normal manner when connected with less power, such as 25 W of power. USB element 112B might not be able to charge its batteries, but otherwise operates in a normal manner when connected with 12.5 W of power based solely on the power received through port 110B. When connected with 2.5 W of power, USB element 112B might not be able to use power received through port 110B for its own internal operations or charging its own batteries, but may be able to maintain USB communications with other USB elements connected to USB hub 104 and USB dock 102, or maintain communications with USB hub 104 and USB dock 102 themselves. When connected with less than 12.5 W of power, USB element 112B might rely upon its own batteries or power source reserves for any power not provided by USB hub 104 and USB dock 102.

USB element 112C may be a keyboard or other peripheral with the ability to use 5 W of power. USB element 112C may be configurable as a USB device. USB element 112C may be configured to receive power from USB dock 102 when connected to USB hub 104 through port 110C. USB element 112C might not include any batteries. USB element 112C might not be able to perform some functions when provided less than 5 W of power, but when connected with 2.5 W of power, may be configured to maintain USB communications with other USB elements connected to USB hub 104 and USB dock 102, or maintain communications with USB hub 104 and USB dock 102 themselves. In one example, if USB element 112C is, for example, a device in compliance with USB 2.0 and USB 3.0, USB element 112C might be configured to operate in compliance with USB 3.0 if connected with 5 W of power, but only in compliance with USB 2.0 if connected with 2.5 W of power.

USB element 112D may be a USB jump drive with the ability to use 5 W of power. USB element 112D may be configurable as a USB device. USB element 112D may be configured to receive power from USB dock 102 when connected to USB hub 104 through port 110D. USB element 112D might not include any batteries. USB element 112D might not be able to perform some functions when provided less than 5 W of power, but when connected with 2.5 W of power, may be configured to maintain USB communications with other USB elements connected to USB hub 104 and USB dock 102, or maintain communications with USB hub 104 and USB dock 102 themselves.

A minimum amount of power may need to be provided to a given USB port 110. The particular minimum amount of power may depend upon the type of USB connection. For example, a type A USB 2.0 port may require a minimum of 2.5 W, a type A USB 3.0 may require a minimum of 4.5 W, and a type C USB 3.0 connector may require, variably depending upon configuration, 2.5 W, 7.5 W, or 15 W. This may reflect a minimum amount of power needed to be provided by USB hub 104 or USB dock 102 in order to detect, enumerate, and maintain communications with a given connected USB element. This may include, for example, maintaining enumeration or attachment of the USB element to the USB hub 104 or USB dock 102. In the examples provided below, each port may be provided with a minimum of 2.5 W to be able to detect attachment of USB elements.

Rules 202 may specify a shared power allocation 204 based upon the available power from Vsource, the identity or configuration of USB elements 112, the maximum power demands from USB elements 112, and other threshold power limits from USB elements 112. For example, rules 202 may specify that, if sufficient power is available from Vsource, the maximum power demands received from all USB elements 112 may be honored.

For example, if Vsource has 200 W available, and if no USB elements are connected to USB hub 104 or USB dock 102, and USB element 112A connects, requesting 100 W, LTBB may allocate 100 W to USB element 112A. This may be performed with the further consideration that no parts of system 100 are operating at temperatures that are too high, such as 50°. Table 1 illustrates the demands and the allocations of this example.

TABLE 1

Allocating Power to Newly Attached Element
When Sufficient Power is Available

| | |
|---|---|
| Vsource-Total Available Power | 200 W |
| USB Element 112A demand | 100 W |
| USB Element 112B demand | N/A |
| USB Element 112C demand | N/A |
| USB Element 112D demand | N/A |
| Sensor 114A temperature (USB Element 112A) | 50° |
| Sensor 114B temperature (USB Element 112B) | 50° |
| Sensor 114C temperature (USB Element 112C) | 50° |
| Sensor 114D temperature (USB Element 112D) | 50° |

TABLE 1-continued

Allocating Power to Newly Attached Element
When Sufficient Power is Available

| | |
|---|---|
| Sensor 114E temperature (USB Hub 104) | 50° |
| Sensor 114F temperature (USB Dock 102) | 50° |
| USB Element 112A allocation | 100 W |
| USB Element 112B allocation | 2.5 W |
| USB Element 112C allocation | 2.5 W |
| USB Element 112D allocation | 2.5 W |

Subsequent demands by USB elements 112B, 112C, 112D, when attached, for their maximum power demands may be similarly fulfilled, as Vsource at 200 W has sufficient power to meet each of these demands, as shown in Table 2.

TABLE 2

Allocating Power to Newly Attached Elements
When Sufficient Power is Available

| | |
|---|---|
| Vsource-Total Available Power | 200 W |
| USB Element 112A demand | 100 W |
| USB Element 112B demand | 50 W |
| USB Element 112C demand | 5 W |
| USB Element 112D demand | 5 W |
| Sensor 114A temperature (USB Element 112A) | 50° |
| Sensor 114B temperature (USB Element 112B) | 50° |
| Sensor 114C temperature (USB Element 112C) | 50° |
| Sensor 114D temperature (USB Element 112D) | 50° |
| Sensor 114E temperature (USB Hub 104) | 50° |
| Sensor 114F temperature (USB Dock 102) | 50° |
| USB Element 112A allocation | 100 W |
| USB Element 112B allocation | 50 W |
| USB Element 112C allocation | 5 W |
| USB Element 112D allocation | 5 W |

However, if insufficient power is available, rules 202 may specify that the amount of power available for each port 110 and thus the respective attached USB element 112 may be reduced. The reduction may be based upon power negotiations with a given USB element 112. The negotiation may occur with a given USB element 112 upon the connection of such a USB element 112 that would otherwise cause the power available from Vsource to run out. If the power for a given USB element 112 is reduced to less than its requested power, the given USB element 112 may operate in a lower-power mode. The lower-power mode may be, for example, a sleep mode, a mode wherein internal batteries are not charged, a mode where internal batteries are not charged as quickly, or a mode where certain features or components are reduced or turned off.

For example, Vsource might only have a total of 100 W available and USB elements 112B, 112C, and 112D may be connected to USB hub 104 and USB dock 102. This power allocation may be illustrated in Table 3:

TABLE 3

Power Allocation Before A New 100 W Demand Arrives

| | |
|---|---|
| Vsource-Total Available Power | 100 W |
| USB Element 112A demand | N/A |
| USB Element 112B demand | 50 W |
| USB Element 112C demand | 5 W |
| USB Element 112D demand | 5 W |
| Sensor 114A temperature (USB Element 112A) | 50° |
| Sensor 114B temperature (USB Element 112B) | 50° |
| Sensor 114C temperature (USB Element 112C) | 50° |
| Sensor 114D temperature (USB Element 112D) | 50° |
| Sensor 114E temperature (USB Hub 104) | 50° |
| Sensor 114F temperature (USB Dock 102) | 50° |

TABLE 3-continued

Power Allocation Before A New 100 W Demand Arrives

| | |
|---|---|
| USB Element 112A allocation | 0 W |
| USB Element 112B allocation | 50 W |
| USB Element 112C allocation | 5 W |
| USB Element 112D allocation | 5 W | wherein 60 W of the available 100 W are utilized by the maximum power demands of USB elements 112B, 112C, 112D. Upon attachment of USB element 112A, with a maximum power demand of 100 W, insufficient power may be available for the maximum requested allocation to USB element 112A. Rules 202 may specify that the power allocation for USB element 112A may be negotiated. As discussed above, USB element 112A, as a laptop, might have a maximum demand of 100 W, but may be able to charge at a slower rate with less than 100 W, and may be able to operate but not charge itself with 25 W. Thus, the power allocation for USB element 112A may be negotiated between LTBB 122, USB hub 104, or USB dock 102 and USB element 112A. USB element 112A may be allocated the remainder of the available power from Vsource, 40 W, while the power allocations are maintained for the other USB elements 112. This is shown in Table 4:

TABLE 4

Sharing Power by Negotiating New
Demand of 100 W Down to 40 W

| | |
|---|---|
| Vsource-Total Available Power | 100 W |
| USB Element 112A demand | 100 W |
| USB Element 112B demand | 50 W |
| USB Element 112C demand | 5 W |
| USB Element 112D demand | 5 W |
| Sensor 114A temperature (USB Element 112A) | 50° |
| Sensor 114B temperature (USB Element 112B) | 50° |
| Sensor 114C temperature (USB Element 112C) | 50° |
| Sensor 114D temperature (USB Element 112D) | 50° |
| Sensor 114E temperature (USB Hub 104) | 50° |
| Sensor 114F temperature (USB Dock 102) | 50° |
| USB Element 112A allocation | 40 W |
| USB Element 112B allocation | 50 W |
| USB Element 112C allocation | 5 W |
| USB Element 112D allocation | 5 W |

In one embodiment, if insufficient power is available for a newly attached USB element, rules 202 may specify that the amount of power available for both the newly attached USB element and one or more already-attached USB elements may be reduced. Thus, a negotiation may occur with all connected USB elements 112 upon the connection of such a USB element 112 that would otherwise cause the power available from Vsource to run out. Taking as a starting point the allocation shown above in Table 3, upon attachment of USB element 112A, with a maximum power demand of 100 W, insufficient power may be available for the maximum requested allocation to USB element 112A. Rules 202 may specify that the power allocation for USB elements 112A, 112B, 112C, 112D may be negotiated. As discussed above, USB element 112A, as a laptop, might have a maximum demand of 100 W, but may be able to charge at a slower rate with less than 100 W, and may be able to operate but not charge itself with 25 W. Moreover, USB element 112B, as a smartphone, might have a maximum demand of 50 W, but may be able to charge at a slower rate with less than 50 W, and may be able to operate but not charge itself with 12.5 W. Thus, the power allocation for USB elements 112A and 112B may be negotiated to a lower amount.

In one embodiment, the reduction may be fairly shared between USB elements 112A, 112B. The reduction may be specified in a percentage of requested power, percentage of available power, or absolute wattage terms. In another embodiment, power for dual-role USB elements (configurable as USB hosts or devices) may be negotiated to less than the maximum requested amount, while maintaining the maximum power requested for certain USB devices. For example, the power allocations for USB elements 112C, 112D, configured as USB devices, may be maintained. An example allocation is shown in Table 5, wherein the power allocations for each of USB elements 112A, 112B are half of the respective original maximum requested power allocations, and power allocations of USB elements 112C, 112D are maintained at their maximum original requested power allocations. Although power allocations are made at 50% of the original requested power allocations, any suitable percentage may be used.

TABLE 5

Sharing Power by Negotiating USB Host Demands by 50%

| | |
|---|---|
| Vsource-Total Available Power | 100 W |
| USB Element 112A demand | 100 W |
| USB Element 112B demand | 50 W |
| USB Element 112C demand | 5 W |
| USB Element 112D demand | 5 W |
| Sensor 114A temperature (USB Element 112A) | 50° |
| Sensor 114B temperature (USB Element 112B) | 50° |
| Sensor 114C temperature (USB Element 112C) | 50° |
| Sensor 114D temperature (USB Element 112D) | 50° |
| Sensor 114E temperature (USB Hub 104) | 50° |
| Sensor 114F temperature (USB Dock 102) | 50° |
| USB Element 112A allocation | 50 W |
| USB Element 112B allocation | 25 W |
| USB Element 112C allocation | 5 W |
| USB Element 112D allocation | 5 W |

The allocation of Table 5 might not allocate all available power, as 15 W is unallocated. This may be performed by LTBB 122 in order to reserve some power for future allocations that might be made without the need for reallocations and renegotiations. However, rules 202 may specify that all available power might be allocated. In Table 5, rules 202 may have specified that each of USB elements 112A, 112B demands may be allocated according to a percentage of the demands—50%. In another embodiment, the percentage of power demands that are to be allocated may be the same for both USB elements 112A, 112B but still sufficient to fully allocate all power available. This is shown in Table 6, wherein 90 W (Vsource less the demands of USB elements 112C, 112D) is divided according to the relative demands of USB elements 112A, 112B (100 W/50 W), resulting in 60 W allocated to USB element 112A and 30 W allocated to USB element 112B:

TABLE 6

Sharing Power by Negotiating USB Host Demands by Percentages Relative to Demands

| | |
|---|---|
| Vsource-Total Available Power | 100 W |
| USB Element 112A demand | 100 W |
| USB Element 112B demand | 50 W |
| USB Element 112C demand | 5 W |
| USB Element 112D demand | 5 W |
| Sensor 114A temperature (USB Element 112A) | 50° |
| Sensor 114B temperature (USB Element 112B) | 50° |
| Sensor 114C temperature (USB Element 112C) | 50° |
| Sensor 114D temperature (USB Element 112D) | 50° |

TABLE 6-continued

Sharing Power by Negotiating USB Host Demands by Percentages Relative to Demands

| | |
|---|---|
| Sensor 114E temperature (USB Hub 104) | 50° |
| Sensor 114F temperature (USB Dock 102) | 50° |
| USB Element 112A allocation | 60 W |
| USB Element 112B allocation | 30 W |
| USB Element 112C allocation | 5 W |
| USB Element 112D allocation | 5 W |

In another example, as shown in Table 7, the power allocated to each of USB elements 112A, 112B when the demand exceeds available power from Vsource may be evenly split in terms of absolute power allocation. This allocation may be made regardless of what was originally requested, but may consider the minimum operating needs of USB elements 112A, 112B. For example, USB element 112A may require at least 25 W to operate but without charging itself, and USB element 112B may require at least 12.5 W to operate but without charging itself. These may represent minimum allocations. For example, assuming that Vsource has 100 W available, the demands of USB elements 112A, 112B may be met by only 45 W each as shown in Table 7:

TABLE 7

Sharing Power by Evenly Dividing Power Among USB Hosts in Absolute Terms

| | |
|---|---|
| Vsource-Total Available Power | 100 W |
| USB Element 112A demand | 100 W |
| USB Element 112B demand | 50 W |
| USB Element 112C demand | 5 W |
| USB Element 112D demand | 5 W |
| Sensor 114A temperature (USB Element 112A) | 50° |
| Sensor 114B temperature (USB Element 112B) | 50° |
| Sensor 114C temperature (USB Element 112C) | 50° |
| Sensor 114D temperature (USB Element 112D) | 50° |
| Sensor 114E temperature (USB Hub 104) | 50° |
| Sensor 114F temperature (USB Dock 102) | 50° |
| USB Element 112A allocation | 45 W |
| USB Element 112B allocation | 45 W |
| USB Element 112C allocation | 5 W |
| USB Element 112D allocation | 5 W |

In this example of Table 7, each of USB elements 112A, 112B is allocated a sufficient amount of power to operate and to perform some amount of charging. However, in the event that Vsource only has 50 W available, this sharing scheme would otherwise allocate USB element 112A (and USB element 112B) only 20 W, which is insufficient for USB element 112A to operate normally without relying upon its own batteries. Thus, as sufficient power remains for USB element 112B to operate without relying upon its own batteries (as USB element 112B only needs 12.5 W for such purposes), USB element 112A may be allocated its minimum 25 W to operate without charging its own batteries, and the remainder provided to USB element 112B, as shown in Table 8:

TABLE 8

Sharing Power with Power Minimums for USB Hosts

| | |
|---|---|
| Vsource-Total Available Power | 50 W |
| USB Element 112A demand | 100 W |
| USB Element 112B demand | 50 W |
| USB Element 112C demand | 5 W |
| USB Element 112D demand | 5 W |

TABLE 8-continued

Sharing Power with Power Minimums for USB Hosts

| | |
|---|---|
| Sensor 114A temperature (USB Element 112A) | 50° |
| Sensor 114B temperature (USB Element 112B) | 50° |
| Sensor 114C temperature (USB Element 112C) | 50° |
| Sensor 114D temperature (USB Element 112D) | 50° |
| Sensor 114E temperature (USB Hub 104) | 50° |
| Sensor 114F temperature (USB Dock 102) | 50° |
| USB Element 112A allocation | 25 W |
| USB Element 112B allocation | 15 W |
| USB Element 112C allocation | 5 W |
| USB Element 112D allocation | 5 W |

Accordingly, rules 202 may consider the minimum operating needs of USB elements 112 for operating without relying upon the batteries of USB element 112, ensuring that such a minimum allocation is made. These minimums may also be applied to percentage allocation schemes such as those shown in Table 6.

In each of the examples of Tables 1-8 shown above, power allocations and power load balancing may be made by LTBB 122 using a shared power allocation 204 that is made for conditions for which there are no thermal warnings, alerts, or violations of temperature thresholds. In one embodiment, LTBB 122 may be configured to amend such a shared power allocation 204 for allocations of power to USB elements 112 based upon further temperature rules 206. LTBB 122 may use temperature rules 206 and a determination that one or more portions of system 100 have reached one or more temperature thresholds to amend shared power allocation 204. Thus, LTBB 122 may be configured to combine load balancing with thermal balancing. LTBB 122 may be configured to apply any suitable number of temperature thresholds, taking different corrective actions at each such threshold. The thresholds may be set to any suitable temperature. Depending upon the given threshold that is exceeded, what portion of system 100 exceeded the threshold, and usage of power in various portions of system 100, LTBB 122 may be configured to reallocate power to address temperature in system 100. The particular amount of power to be reallocated, as well as the portions of system 100 to be reallocated, may be defined by rules 202.

As mentioned above, any suitable number of thresholds may be used and such thresholds may be of any suitable quantification. For the examples of the present disclosure, temperature rules may include temperature rules 206 with thresholds of 60, 85, and 110 degrees may be used, defining four ranges of operation: less than 60 degrees, between 60 and 85 degrees, between 85 and 110 degrees, and above 110 degrees.

Temperature rules 206 may be configured to define that power is to be reduced in any suitable terms, such a reducing power to a percentage available, reducing power by a percentage of previously allocated power, or by limiting power to an absolute wattage. For example, for a given portion of system 100 reporting that the given portion is operating at less than 60 degrees, no reduction may be made. For a given portion of system 100 reporting that the given portion is operating between 60 degrees and 85 degrees, a reduction of 50% of the existing power allocation may be made, or a limit of 65 W for power allocation may be made. For a given portion of system 100 reporting that the given portion is operating between 85 degrees and 110 degrees, a reduction of 75% of the existing power allocation may be made, or a limit of 30 W for power allocation may be made. For a given portion of system 100 reporting that the given portion is operating above 110 degrees, the power for the given portion of system 100 may be turned off, or reduced to the minimum amount needed to maintain USB attachment (such as 2.5 W). Moreover, the power for a given portion of system 100 may be shut off by LTBB 122 based upon user input, or upon input of another portion of system 100, even without a thermal event of greater than 110 degrees.

For example, taking the scenario from Table 2, but if, instead, temperature sensor 114E or temperature sensor 114F report that temperature in an enclosure for USB hub 104 or USB dock 102, respectively, is 70 degrees, then the power to all USB elements connected to USB dock 102 or USB hub 104 may be reduced by 50% by LTBB 122, as shown in Table 9.

TABLE 9

Power Allocation, USB Dock at 70°, Reducing All Allocations by 50%

| | |
|---|---|
| Vsource-Total Available Power | 200 W |
| USB Element 112A demand | 100 W |
| USB Element 112B demand | 50 W |
| USB Element 112C demand | 5 W |
| USB Element 112D demand | 5 W |
| USB Element 112A initial allocation | 100 W |
| USB Element 112B initial allocation | 50 W |
| USB Element 112C initial allocation | 5 W |
| USB Element 112D initial allocation | 5 W |
| Sensor 114A temperature (USB Element 112A) | 50° |
| Sensor 114B temperature (USB Element 112B) | 50° |
| Sensor 114C temperature (USB Element 112C) | 50° |
| Sensor 114D temperature (USB Element 112D) | 50° |
| Sensor 114E temperature (USB Hub 104) | 70° |
| Sensor 114F temperature (USB Dock 102) | 70° |
| USB Element 112A allocation | 50 W |
| USB Element 112B allocation | 25 W |
| USB Element 112C allocation | 2.5 W |
| USB Element 112D allocation | 2.5 W |

In another example, taking the scenario from Table 2, but if, instead, temperature sensor 114E or temperature sensor 114F report that temperature in an enclosure for USB hub 104 or USB dock 102, respectively, is 70 degrees, then the power to all USB elements connected to USB dock 102 or USB hub 104 may be reduced to a maximum of 65 W by LTBB 122, as shown in Table 10.

TABLE 10

Power Allocation, USB Dock at 70°, Reducing All Allocations to 65 W Maximum

| | |
|---|---|
| Vsource-Total Available Power | 200 W |
| USB Element 112A demand | 100 W |
| USB Element 112B demand | 50 W |
| USB Element 112C demand | 5 W |
| USB Element 112D demand | 5 W |
| USB Element 112A initial allocation | 100 W |
| USB Element 112B initial allocation | 50 W |
| USB Element 112C initial allocation | 5 W |
| USB Element 112D initial allocation | 5 W |
| Sensor 114A temperature (USB Element 112A) | 50° |
| Sensor 114B temperature (USB Element 112B) | 50° |
| Sensor 114C temperature (USB Element 112C) | 50° |
| Sensor 114D temperature (USB Element 112D) | 50° |
| Sensor 114E temperature (USB Hub 104) | 70° |
| Sensor 114F temperature (USB Dock 102) | 70° |
| USB Element 112A allocation | 65 W |
| USB Element 112B allocation | 50 W |
| USB Element 112C allocation | 5 W |
| USB Element 112D allocation | 5 W |

Compared to the scenario in Table 9, this may have the effect of only reducing power allocation for the largest users of power (in this example, USB element 112A, a laptop), while allowing lower-power users to continue to use their otherwise fully requested or allocated portions (in this example, USB elements 112B, 112C, 112D). However, for a scenario such as Tables 5-7, but wherein temperature of USB dock 102 or USB hub 104 is instead 70 degrees, the power reduction scheme shown in Table 10 might not have any effect on thermal control or balancing. This is because, as shown in Tables 5-7, USB element 112A is already allocated, respectively, 50 W, 60 W, and 45 W, which are each less than the 65 W limit. Thus, a percentage reduction scheme such as the one shown in Table 9 might be more appropriate for such a situation. For example, taking the scenario from Table 6, wherein shared power allocation 204 has resulted in allocating USB element 112A 60 W, USB element 112B 30 W, and USB elements 112C, 112D 5 W each, but where the temperature of USB dock 102 or USB hub 104 is instead 70 degrees, power allocation may be reduced for each USB element by 50%, as-was applied in Table 9, resulting in the allocation shown below in Table 11:

TABLE 11

Reduced Power Allocation, USB Dock at 70°, Further Reducing Allocations by 50%

| | |
|---|---|
| Vsource-Total Available Power | 100 W |
| USB Element 112A demand | 100 W |
| USB Element 112B demand | 50 W |
| USB Element 112C demand | 5 W |
| USB Element 112D demand | 5 W |
| USB Element 112A initial allocation | 60 W |
| USB Element 112B initial allocation | 30 W |
| USB Element 112C initial allocation | 5 W |
| USB Element 112D initial allocation | 5 W |
| Sensor 114A temperature (USB Element 112A) | 50° |
| Sensor 114B temperature (USB Element 112B) | 50° |
| Sensor 114C temperature (USB Element 112C) | 50° |
| Sensor 114D temperature (USB Element 112D) | 50° |
| Sensor 114E temperature (USB Hub 104) | 70° |
| Sensor 114F temperature (USB Dock 102) | 70° |
| USB Element 112A allocation | 30 W |
| USB Element 112B allocation | 15 W |
| USB Element 112C allocation | 2.5 W |
| USB Element 112D allocation | 2.5 W |

The allocation illustrated in Table 11 may be further modified by applying the percentage reductions to only the USB hosts (USB elements 112A, 112B) while maintaining a full 5 W allocation for the USB devices (USB elements 112C, 112D).

In another example, taking the scenario from Table 2, but if, instead, temperature sensor 114E or temperature sensor 114F report that temperature in an enclosure for USB hub 104 or USB dock 102, respectively, is 90 degrees, then the power to all USB elements connected to USB dock 102 or USB hub 104 may be reduced to 25% by LTBB 122, as shown in Table 12.

TABLE 12

Power Allocation, USB Dock at 90°, Reducing All Allocations to 25%

| | |
|---|---|
| Vsource-Total Available Power | 200 W |
| USB Element 112A demand | 100 W |
| USB Element 112B demand | 50 W |
| USB Element 112C demand | 5 W |
| USB Element 112D demand | 5 W |
| USB Element 112A initial allocation | 100 W |
| USB Element 112B initial allocation | 50 W |
| USB Element 112C initial allocation | 5 W |
| USB Element 112D initial allocation | 5 W |
| Sensor 114A temperature (USB Element 112A) | 50 |
| Sensor 114B temperature (USB Element 112B) | 50° |

TABLE 12-continued

Power Allocation, USB Dock at 90°, Reducing All Allocations to 25%

| | |
|---|---|
| Sensor 114C temperature (USB Element 112C) | 50° |
| Sensor 114D temperature (USB Element 112D) | 50° |
| Sensor 114E temperature (USB Hub 104) | 90° |
| Sensor 114F temperature (USB Dock 102) | 90° |
| USB Element 112A allocation | 25 W |
| USB Element 112B allocation | 12.5 W |
| USB Element 112C allocation | 2.5 W |
| USB Element 112D allocation | 2.5 W |

In the example of Table 12, the allocations of USB elements 112C, 112D may be held at a minimum 2.5 W necessary to maintain USB communication with the USB elements.

In another example, taking the scenario from Table 2, but if, instead, temperature sensor 114E or temperature sensor 114F report that temperature in an enclosure for USB hub 104 or USB dock 102, respectively, is 90 degrees, then the power to all USB elements connected to USB dock 102 or USB hub 104 may be reduced to a maximum of 30 W by LTBB 122, as shown in Table 13.

TABLE 13

Power Allocation, USB Dock at 90°, Reducing All Allocations to 30 W Maximum

| | |
|---|---|
| Vsource-Total Available Power | 200 W |
| USB Element 112A demand | 100 W |
| USB Element 112B demand | 50 W |
| USB Element 112C demand | 5 W |
| USB Element 112D demand | 5 W |
| USB Element 112A initial allocation | 100 W |
| USB Element 112B initial allocation | 50 W |
| USB Element 112C initial allocation | 5 W |
| USB Element 112D initial allocation | 5 W |
| Sensor 114A temperature (USB Element 112A) | 50° |
| Sensor 114B temperature (USB Element 112B) | 50° |
| Sensor 114C temperature (USB Element 112C) | 50° |
| Sensor 114D temperature (USB Element 112D) | 50° |
| Sensor 114E temperature (USB Hub 104) | 90° |
| Sensor 114F temperature (USB Dock 102) | 90° |
| USB Element 112A allocation | 30 W |
| USB Element 112B allocation | 30 W |
| USB Element 112C allocation | 5 W |
| USB Element 112D allocation | 5 W |

Similar to the scenario in Table 10, this may have the effect of only reducing power allocation for the largest users of power (in this example, USB element 112A, a laptop and USB element 112B, a smartphone), while allowing lower-power users to continue to use their otherwise fully requested or allocated portions (in this example, USB elements 112C, 112D).

In another example, taking the scenario from Table 2, but if, instead, temperature sensor 114E or temperature sensor 114F report that temperature in an enclosure for USB hub 104 or USB dock 102, respectively, is 115 degrees, then the power to all USB elements connected to USB dock 102 or USB hub 104 may be reduced to 0% by LTBB 122, as shown in Table 14:

TABLE 14

Power Allocation, USB Dock at 115°, Reducing All Allocations to 0%

| | |
|---|---|
| Vsource-Total Available Power | 200 W |
| USB Element 112A demand | 100 W |
| USB Element 112B demand | 50 W |

TABLE 14-continued

Power Allocation, USB Dock at 115°, Reducing All Allocations to 0%

| | |
|---|---|
| USB Element 112C demand | 5 W |
| USB Element 112D demand | 5 W |
| USB Element 112A initial allocation | 100 W |
| USB Element 112B initial allocation | 50 W |
| USB Element 112C initial allocation | 5 W |
| USB Element 112D initial allocation | 5 W |
| Sensor 114A temperature (USB Element 112A) | 50° |
| Sensor 114B temperature (USB Element 112B) | 50° |
| Sensor 114C temperature (USB Element 112C) | 50° |
| Sensor 114D temperature (USB Element 112D) | 50° |
| Sensor 114E temperature (USB Hub 104) | 115° |
| Sensor 114F temperature (USB Dock 102) | 115° |
| USB Element 112A allocation | 0 W |
| USB Element 112B allocation | 0 W |
| USB Element 112C allocation | 0 W |
| USB Element 112D allocation | 0 W |

The changes to allocations based on temperature may be reversed when the indicated portion of system 100 cools to below the thresholds defined by temperature rules 206.

Each of the power allocation schemes based on thermal warnings may be applied to an individual one of USB elements 112A, 112B, 112C, 112D based upon individual temperature readings from sensors 114A, 114B, 114C, 114D, respectively.

For example, if sensor 114A indicates that port 110A, connecting USB element 112A, is experiencing a temperature of 70 degrees, then the allocation for USB element 112A may be reduced by 50% or to 65 W. An example such allocations are illustrated in Tables 15 and 16:

TABLE 15

Power Allocation, USB Element 112A at 70°, Reducing USB Element 112A by 50%

| | |
|---|---|
| Vsource-Total Available Power | 200 W |
| USB Element 112A demand | 100 W |
| USB Element 112B demand | 50 W |
| USB Element 112C demand | 5 W |
| USB Element 112D demand | 5 W |
| USB Element 112A initial allocation | 100 W |
| USB Element 112B initial allocation | 50 W |
| USB Element 112C initial allocation | 5 W |
| USB Element 112D initial allocation | 5 W |
| Sensor 114A temperature (USB Element 112A) | 70° |
| Sensor 114B temperature (USB Element 112B) | 50° |
| Sensor 114C temperature (USB Element 112C) | 50° |
| Sensor 114D temperature (USB Element 112D) | 50° |
| Sensor 114E temperature (USB Hub 104) | 50° |
| Sensor 114F temperature (USB Dock 102) | 50° |
| USB Element 112A allocation | 50 W |
| USB Element 112B allocation | 50 W |
| USB Element 112C allocation | 5 W |
| USB Element 112D allocation | 5 W |

TABLE 16

Power Allocation, USB Element 112A at 70°, Reducing USB Element 112A to 65 W.

| | |
|---|---|
| Vsource-Total Available Power | 200 W |
| USB Element 112A demand | 100 W |
| USB Element 112B demand | 50 W |
| USB Element 112C demand | 5 W |
| USB Element 112D demand | 5 W |
| USB Element 112A initial allocation | 100 W |
| USB Element 112B initial allocation | 50 W |
| USB Element 112C initial allocation | 5 W |
| USB Element 112D initial allocation | 5 W |

TABLE 16-continued

Power Allocation, USB Element 112A at 70°, Reducing USB Element 112A to 65 W.

| | |
|---|---|
| Sensor 114A temperature (USB Element 112A) | 70° |
| Sensor 114B temperature (USB Element 112B) | 50° |
| Sensor 114C temperature (USB Element 112C) | 50° |
| Sensor 114D temperature (USB Element 112D) | 50° |
| Sensor 114E temperature (USB Hub 104) | 50° |
| Sensor 114F temperature (USB Dock 102) | 50° |
| USB Element 112A allocation | 65 W |
| USB Element 112B allocation | 50 W |
| USB Element 112C allocation | 5 W |
| USB Element 112D allocation | 5 W |

In Table 15, the power allocated to USB element 112A, whose associated port 110A is experiencing the high temperature of 70 degrees, may be reduced from 100 W to 50 W. In Table 16, the power allocated to USB element 112A, whose associated port is experiencing the high temperature of 70 degrees, may be reduced from 100 W to 65 W. The allocations of the others of USB elements 112 may be unchanged. Such an amendment may be made to any shared power allocation 204.

In another example, if sensor 114A indicates that port 110A, connecting USB element 112A, is experiencing a temperature of 90 degrees, then the allocation for USB element 112A may be reduced to 25% or to 30 W. An example such allocations are illustrated in Tables 17 and 18:

TABLE 17

Power Allocation, USB Element 112A at 90°, Reducing USB Element 112A to 25%

| | |
|---|---|
| Vsource-Total Available Power | 200 W |
| USB Element 112A demand | 100 W |
| USB Element 112B demand | 50 W |
| USB Element 112C demand | 5 W |
| USB Element 112D demand | 5 W |
| USB Element 112A initial allocation | 100 W |
| USB Element 112B initial allocation | 50 W |
| USB Element 112C initial allocation | 5 W |
| USB Element 112D initial allocation | 5 W |
| Sensor 114A temperature (USB Element 112A) | 90° |
| Sensor 114B temperature (USB Element 112B) | 50° |
| Sensor 114C temperature (USB Element 112C) | 50° |
| Sensor 114D temperature (USB Element 112D) | 50° |
| Sensor 114E temperature (USB Hub 104) | 50° |
| Sensor 114F temperature (USB Dock 102) | 50° |
| USB Element 112A allocation | 25 W |
| USB Element 112B allocation | 50 W |
| USB Element 112C allocation | 5 W |
| USB Element 112D allocation | 5 W |

TABLE 18

Power Allocation, USB Element 112A at 90°, Reducing USB Element 112A to 30 W.

| | |
|---|---|
| Vsource-Total Available Power | 200 W |
| USB Element 112A demand | 100 W |
| USB Element 112B demand | 50 W |
| USB Element 112C demand | 5 W |
| USB Element 112D demand | 5 W |
| USB Element 112A initial allocation | 100 W |
| USB Element 112B initial allocation | 50 W |
| USB Element 112C initial allocation | 5 W |
| USB Element 112D initial allocation | 5 W |
| Sensor 114A temperature (USB Element 112A) | 70° |
| Sensor 114B temperature (USB Element 112B) | 50° |
| Sensor 114C temperature (USB Element 112C) | 50° |
| Sensor 114D temperature (USB Element 112D) | 50° |
| Sensor 114E temperature (USB Hub 104) | 50° |
| Sensor 114F temperature (USB Dock 102) | 50° |

TABLE 18-continued

Power Allocation, USB Element 112A at
90°, Reducing USB Element 112A to 30 W.

| | |
|---|---|
| USB Element 112A allocation | 30 W |
| USB Element 112B allocation | 50 W |
| USB Element 112C allocation | 5 W |
| USB Element 112D allocation | 5 W |

In Table 17, the power allocated to USB element 112A, whose associated port is experiencing the high temperature of 90 degrees, may be reduced from 100 W to 25 W. In Table 18, the power allocated to USB element 112A, whose associated port is experiencing the high temperature of 90 degrees, may be reduced from 100 W to 30 W. The allocations of the others of USB elements 112 may be unchanged. Such an amendment may be made to any shared power allocation 204.

In yet another example, if sensor 114A indicates that port 110A, connecting USB element 112A, is experiencing a temperature of 115 degrees, then the allocation for USB element 112A may be shut off, as illustrated in Table 19:

TABLE 19

Power Allocation, USB Element 112A at
115°, Shutting off USB Element 112A

| | |
|---|---|
| Vsource-Total Available Power | 200 W |
| USB Element 112A demand | 100 W |
| USB Element 112B demand | 50 W |
| USB Element 112C demand | 5 W |
| USB Element 112D demand | 5 W |
| USB Element 112A initial allocation | 100 W |
| USB Element 112B initial allocation | 50 W |
| USB Element 112C initial allocation | 5 W |
| USB Element 112D initial allocation | 5 W |
| Sensor 114A temperature (USB Element 112A) | 115° |
| Sensor 114B temperature (USB Element 112B) | 50° |
| Sensor 114C temperature (USB Element 112C) | 50° |
| Sensor 114D temperature (USB Element 112D) | 50° |
| Sensor 114E temperature (USB Hub 104) | 50° |
| Sensor 114F temperature (USB Dock 102) | 50° |
| USB Element 112A allocation | 0 W |
| USB Element 112B allocation | 50 W |
| USB Element 112C allocation | 5 W |
| USB Element 112D allocation | 5 W |

In Table 19, the power allocated to USB element 112A, whose associated port is experiencing the high temperature of 115 degrees, may be shut off. The allocations of the others of USB elements 112 may be unchanged. Such an amendment may be made to any shared power allocation 204.

User input or system settings may be used to change rules 202 or override allocations that would otherwise be made to generate shared power allocation 204. However, this user input or these system settings in turn may be overridden by thermal balancing considerations in temperature rules 206. Rules 206 may be changed or edited by users.

For example, rules 202 may specify that, wherein a system 100 is implemented in a vehicle, 200 W may be available from Vsource when the engine of the vehicle is running, but when the vehicle is not running, only 10 W may be available from Vsource. However, more power may be actually available than 10 W in the form of stored power in a car battery, even though such power is not advertised as available from USB dock 102 or USB hub 104 to USB elements 112 connected thereto. A user of system 100 in a situation wherein the vehicle is turned off may wish to use the stored charge available in the car battery to charge a smartphone such as USB element 112B. Thus, even though only 10 W may be available to generate shared power allocation 204, this limit may be overridden by user input or system settings. In such a case, 12.5 W or more, sufficient to operate and possibly charge USB element 112B, may be provided USB element 112B from USB dock 102 or USB hub 104. Others of USB elements 112 may be provided the minimum power necessary to maintain a USB connection. This is shown in Table 20:

TABLE 20

Vehicle Off, USB Element 112B to be Charged

| | |
|---|---|
| Vsource-Total Available Power | 10 W |
| USB Element 112A demand | 100 W |
| USB Element 112B demand | 50 W |
| USB Element 112C demand | 5 W |
| USB Element 112D demand | 5 W |
| USB Element 112A initial allocation | 2.5 W |
| USB Element 112B initial allocation | 25 W |
| USB Element 112C initial allocation | 2.5 W |
| USB Element 112D initial allocation | 2.5 W |
| Sensor 114A temperature (USB Element 112A) | 50° |
| Sensor 114B temperature (USB Element 112B) | 50° |
| Sensor 114C temperature (USB Element 112C) | 50° |
| Sensor 114D temperature (USB Element 112D) | 50° |
| Sensor 114E temperature (USB Hub 104) | 50° |
| Sensor 114F temperature (USB Dock 102) | 50° |
| USB Element 112A allocation | 2.5 W |
| USB Element 112B allocation | 25 W |
| USB Element 112C allocation | 2.5 W |
| USB Element 112D allocation | 2.5 W |

Thus, the power allocated to USB elements 112 may exceed the amount of power advertised as available from Vsource. Such an over-allocation may drain batteries or other sources of Vsource. The user input to override the 2.5 W allocation to USB element 112B may be explicit, such as user pushing a button to enable charging of the particular USB element 112B connected to a particular port, such as port 110B. The user input to override the 2.5 W allocation to USB element 112B may be implicit or based in system settings, such as a user preference setting an option for system 100 to charge any smartphone. As USB element 112B may be recognized as a type of smartphone, charging of USB element 112B may be allowed with a 25 W allocation based upon such a user preference setting. Moreover, this override may be based upon an identity of the port, such as port 110B. Users of system 100 may understand, from product labeling or other documentation, that a USB element plugged into port 110B, among all of available ports 110, will be provided sufficient power for charging even when the vehicle of system 100 is turned off.

However, this override of an allocation that would otherwise be provided by rules 202 to yield shared power allocation 204 may itself be overridden or further amended by temperature rules 206. Using the example above from Table 20, if the port 110B connecting USB element 112B experiences a high temperature, then its power may be throttled or port 110B shut off completely. For example, if port 110B is experiencing a temperature of 90 degrees, then the allocation may be reduced to 25% of its previous allocation, as shown in Table 21:

TABLE 21

Vehicle Off, USB Element 112B to be Charged
but at 90°, Allocation Reduced to 25%

| | |
|---|---|
| Vsource-Total Available Power | 10 W |
| USB Element 112A demand | 100 W |
| USB Element 112B demand | 50 W |

TABLE 21-continued

Vehicle Off, USB Element 112B to be Charged
but at 90°, Allocation Reduced to 25%

| | |
|---|---|
| USB Element 112C demand | 5 W |
| USB Element 112D demand | 5 W |
| USB Element 112A initial allocation | 2.5 W |
| USB Element 112B initial allocation | 25 W |
| USB Element 112C initial allocation | 2.5 W |
| USB Element 112D initial allocation | 2.5 W |
| Sensor 114A temperature (USB Element 112A) | 50° |
| Sensor 114B temperature (USB Element 112B) | 90° |
| Sensor 114C temperature (USB Element 112C) | 50° |
| Sensor 114D temperature (USB Element 112D) | 50° |
| Sensor 114E temperature (USB Hub 104) | 50° |
| Sensor 114F temperature (USB Dock 102) | 50° |
| USB Element 112A allocation | 2.5 W |
| USB Element 112B allocation | 6.25 W |
| USB Element 112C allocation | 2.5 W |
| USB Element 112D allocation | 2.5 W |

Thus, in such a situation, allocation to USB element 112B may be reduced to 6.25 W.

Figure 3:
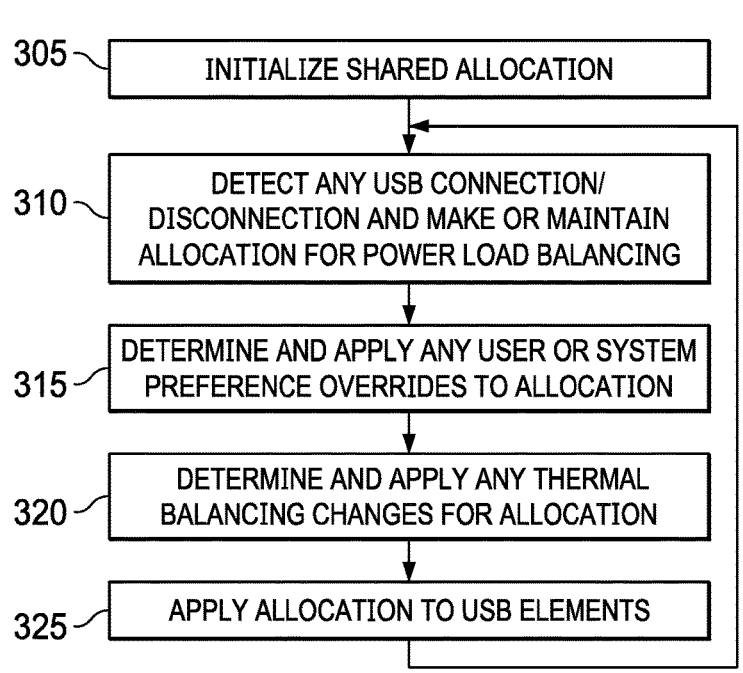
FIG. 3 is an illustration of a method for performing thermal and power load balancing, according to embodiments of the present disclosure.

FIG. 3 is an illustration of a method 300 for performing thermal and power load balancing, according to embodiments of the present disclosure. Method 300 may be performed by any suitable portion of system 100, such as LTBB 122, USB dock 102, or USB hub 104. Method 300 may be performed by analog circuitry, digital circuitry, instructions for execution by a processor, or any suitable combination thereof. Although illustrated with a certain number of steps, method 300 may be performed with more or fewer steps. Moreover, although illustrated in a certain order, the steps of method 300 may be performed in any suitable order. One or more steps of method 300 may be omitted, repeated, or performed in parallel or recursively. Method 300 may begin or end at any suitable step, and may repeat.

At step 305, a shared power allocation for USB elements to be connected to a USB dock or hub may be initialized. The shared power allocation may be empty, or may include default settings for USB elements.

At step 310, the shared power allocation may begin to be modified. The shared power allocation may be received from step 305 or from a previous iteration of portions of method 300. First, any new USB connections or disconnects to or from the detected new USB hub or dock may be detected. The changes of the power demands arising from the USB connections or disconnects may be balanced with existing power demands and available power. Allocations of power may be made or maintained based upon such balancing. The shared power allocation as-modified by step 310 may be made available for further steps, such as step 315. The balancing of step 310 may be performed, for example, by the steps illustrated in FIG. 4.

At step 315, any system or user preferences or selections that might override the shared power allocation as provided at the end of step 310 may be evaluated. Such preferences or selections may be used to modify the shared power allocation as provided at the end of step 310. A further modified version of the shared power allocation may be made available for further steps, such as step 320. The evaluation and application of such preferences may be performed, for example, by the steps illustrated in FIG. 5.

At step 320, any considerations of thermal balancing may be evaluated and applied to the shared power allocation. This may be performed, for example, by the steps illustrated in FIGS. 6 and 7.

At step 325, the shared power allocation, as modified from the original received based upon new or removed USB connections, power balancing thereof, user or system preferences, and thermal balancing, may be applied to USB ports 110, 118 of the USB hub 104 or USB dock 102. Method 300 may repeat at step 310, wherein the shared power allocation applied in step 325 may be further modified by method 300.

Figure 4A:
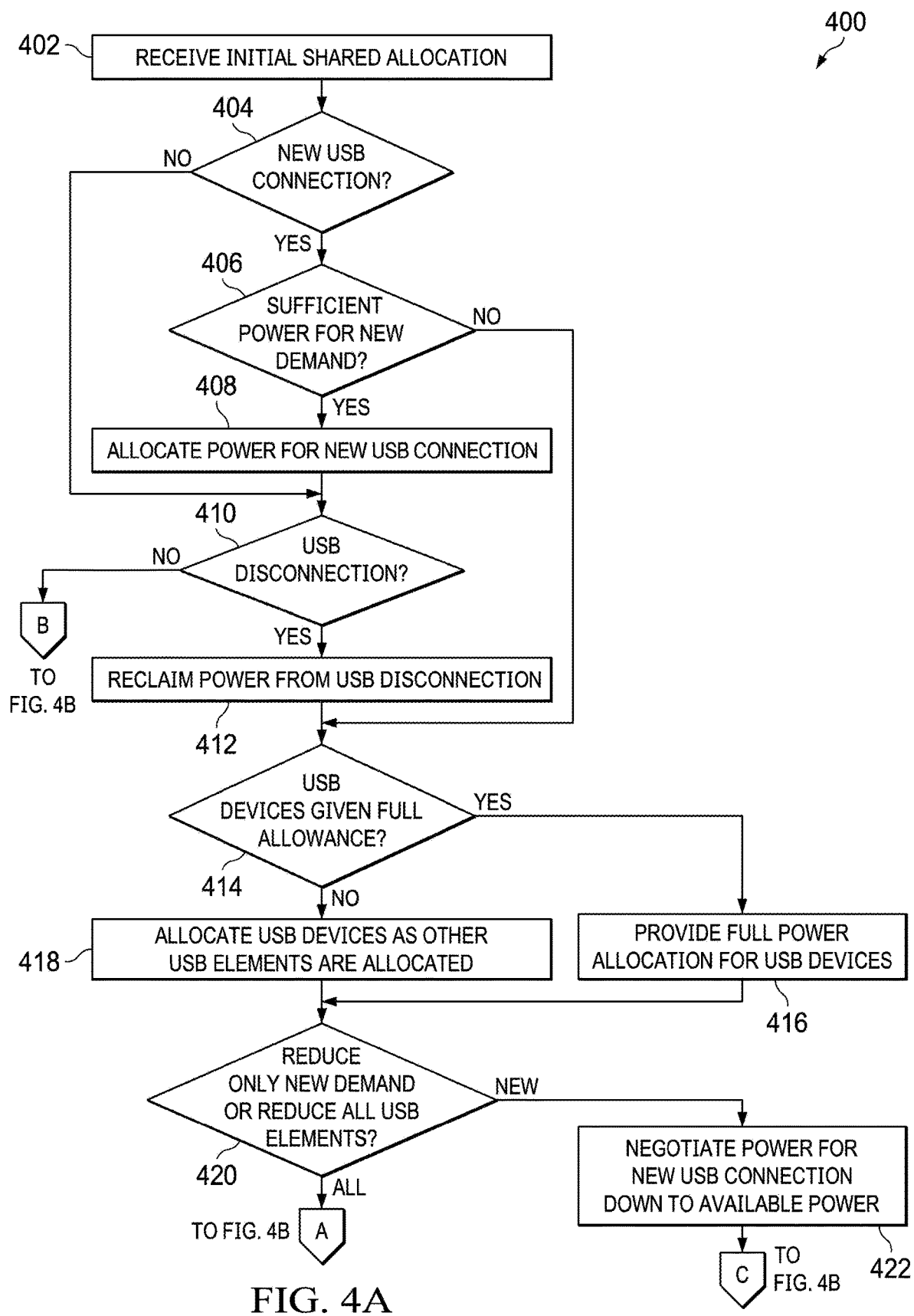
FIGS. 4A and 4B are illustrations of a method for performing power load balancing based upon any new or disused USB connections, according to embodiments of the present disclosure.
Figure 4B:
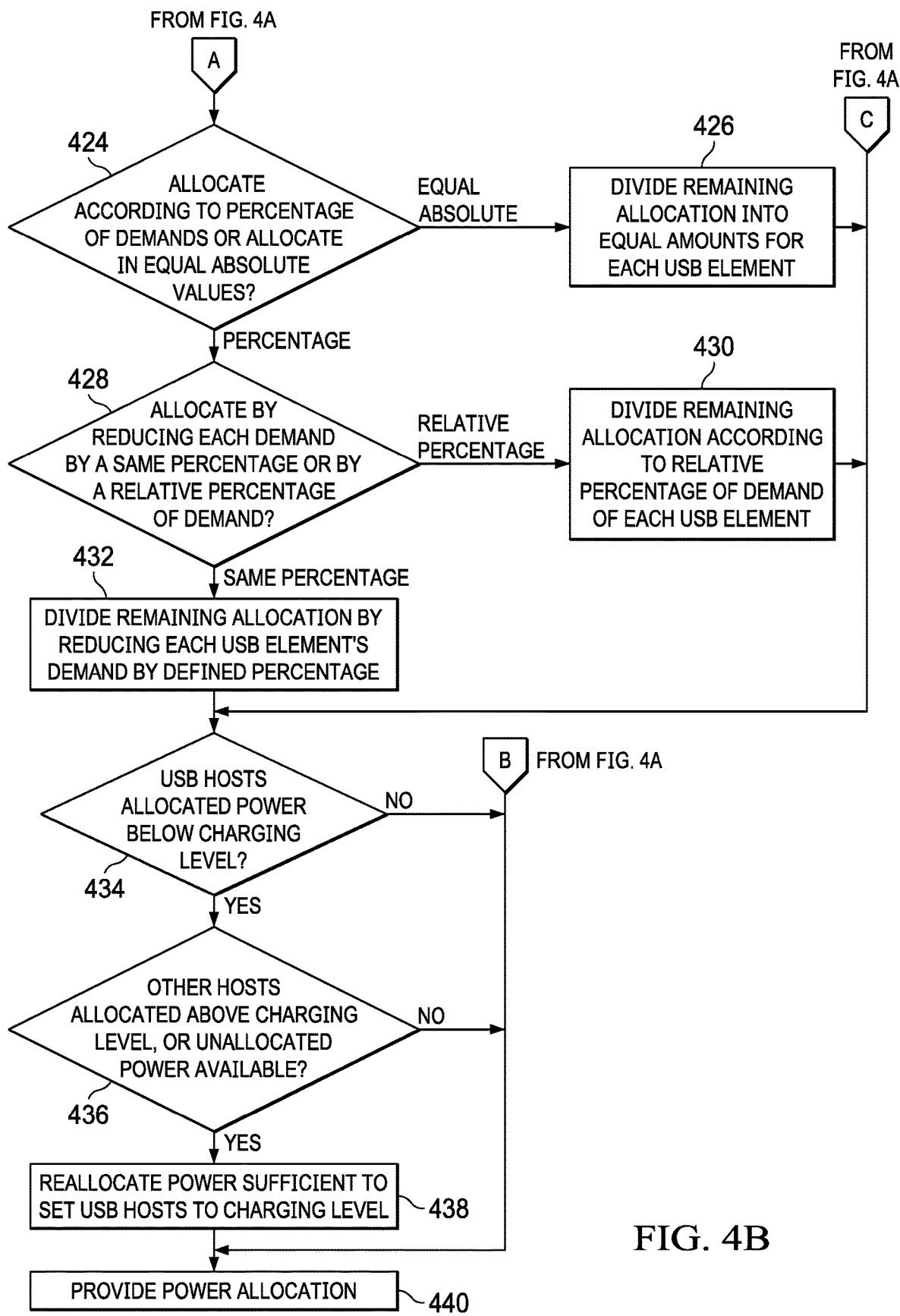

FIGS. 4A and 4B are illustrations of a method 400 for performing power load balancing based upon any new or disused USB connections, according to embodiments of the present disclosure. Method 400 may implement, fully or in part, step 310 from FIG. 3. Method 400 may be performed by any suitable portion of system 100, such as LTBB 122, USB dock 102, or USB hub 104. Method 400 may be performed by analog circuitry, digital circuitry, instructions for execution by a processor, or any suitable combination thereof. Although illustrated with a certain number of steps, method 400 may be performed with more or fewer steps. Moreover, although illustrated in a certain order, the steps of method 400 may be performed in any suitable order. One or more steps of method 400 may be omitted, repeated, or performed in parallel or recursively. Method 400 may begin or end at any suitable step, and may repeat.

At 402, an initial shared allocation may be received.

At 404, it may be determined whether a USB element has newly attached to the USB dock or hub. If so, method 400 may proceed to step 406. Otherwise, method 400 may proceed to step 410.

At 406, the power demands of the newly attached USB element may be determined, and it may be determined whether there is sufficient unallocated power to accommodate the maximum power demand of the newly attached USB element. If so, method 400 may proceed to step 408. Otherwise method 400 may proceed to step 414 for a power balancing evaluation.

At step 408, the demands of the newly attached USB element may be added to the shared power allocation. Method 400 may proceed to 410.

At step 410, it may be determined whether USB element has been disconnected from the USB dock or hub. The power allocated to such a USB element might be reclaimed. If a USB element has been disconnected, method 400 may proceed to step 412. Otherwise, method 400 may proceed to step 440.

At step 412, the power allocated to a formerly connected USB element may be reclaimed in the allocations. Method 400 may proceed to step 414 to perform load balancing, as other USB elements connected to the dock or hub might be rebalanced in view of the additional power now available to be allocated.

At step 414, load balancing may be initiated between potentially conflicting demands among USB elements connected to the USB dock or hub. First, at step 414, it may be determined whether USB devices (as opposed to USB hosts), and, in particular, low-power USB devices such as peripherals, keyboards, or jump drives, are to be given their full requested demand for power, or whether such USB devices are to be throttled just as other USB elements will be throttled. If the USB devices are to be given their full allowance, then method 400 may proceed to step 416. Otherwise, method 400 may proceed to step 418. At step 416, full power for such USB devices may be provided in the shared power allocation. At step 418, power for such USB devices may be postponed and such USB devices treated the same as other USB elements. Method 400 may proceed to step 420.

At step 420, it may be determined whether all remaining USB elements (taking into account whether USB devices will be included or not in power reduction) are to be considered for reduction of power allocation, or whether only the newly attached USB element is to be considered for a reduction of power allocation. If all remaining USB elements are to be considered for a reduction of power allocation, method 400 may proceed to step 424. If only the newly attached USB element is to be considered for a reduction of power allocation, method 400 may proceed to step 422.

At step 422, power for the newly attached USB element may be negotiated down to the power that is currently unassigned and available in the shared power allocation. Method 400 may proceed to step 434.

At step 424, it may be determined whether power for the remaining USB elements will be allocated according to a percentage of demands by the USB elements or according to equal allocation based upon absolute wattage available. If power will be allocated according to a percentage of demands, then method 400 may proceed to step 428. Otherwise, method 400 may proceed to step 426.

At step 426, the allocation remaining (after allocating any dedicated power for USB devices in step 416) may be equally divided among the remaining USB elements. Method 400 may proceed to step 434.

At step 428, it may be determined whether allocation for the remaining USB elements may be performed by reducing demand for each such USB element by a same percentage for each such USB element, or by reducing demand for each such USB element by a percentage corresponding to the proportion of the USB element's power demand to the total demand by the remaining USB elements. If a same percentage is to be used for allocation to each USB element, method 400 may proceed to step 432. Otherwise, method 400 may proceed to step 430.

At step 430, the remaining available power allocation may be divided amongst the remaining USB elements, wherein, for a given USB element and its power demand, the given USB element will be allocated a percentage of the remaining available power equal to the percentage of the overall demand attributable to the given USB element's demand. For example, if the USB element demands 20 W, and other remaining USB elements demand a total of 80 W, then the USB element will be allocated one fifth of the remaining available power allocation. Method 400 may proceed to step 434.

At step 432, the remaining available power allocation may be divided amongst the remaining USB elements by reducing or fulfilling each USB element's demand by a same percentage for all such USB elements. For example, the demand of each such USB element may be fulfilled at a rate of half of the requested amount. The percentage may be predefined, or may be defined so as to maximize the usage of the available power allocation. Method 400 may proceed to step 434.

At step 434, a check may be performed to determine whether any USB elements, such as USB hosts, have been allocated a power amount that is less than a given threshold. Any suitable threshold may be used. For example, at step 434, it may be determined whether any USB hosts have been allocated a power amount that is insufficient for the USB host to operate without relying upon its own batteries. In such a case, the USB host may have been allocated power that is below a charging level. The threshold may thus be different for different USB elements. If any USB elements have been allocated a power amount below a given threshold, method 400 may proceed to step 436. Otherwise, method 400 may proceed to step 440.

At step 436, it may be determined, for each USB element identified as allocated an insufficient amount of power in step 434, whether other USB elements, such as USB hosts, have been allocated power in excess of their own minimum thresholds, or if there is unallocated power available. This may represent a scenario wherein power may be reallocated from a first USB element to another, so long as the first USB element maintains sufficient power to, for example, operate without relying upon its own batteries. The amount of power to be reallocated to the USB element identified in step 434 may be sufficient so that such a USB element might have power equal or above the given threshold applied in step 434. For example, power may be reallocated to the USB element identified in step 434, but only as much so that the USB element might not need to rely upon the power in its own batteries. If any reallocation of power can be made, method 400 may proceed to step 438. Otherwise, method 400 may proceed to step 440.

At step 438, the existing shared power allocation may be modified so as to meet power requirements of USB elements identified in step 434, to the extent that such power is available. Method 400 may proceed to step 440.

At step 440, the shared power allocation as modified by the above steps may be provided for subsequent processing by other methods.

Figure 5:
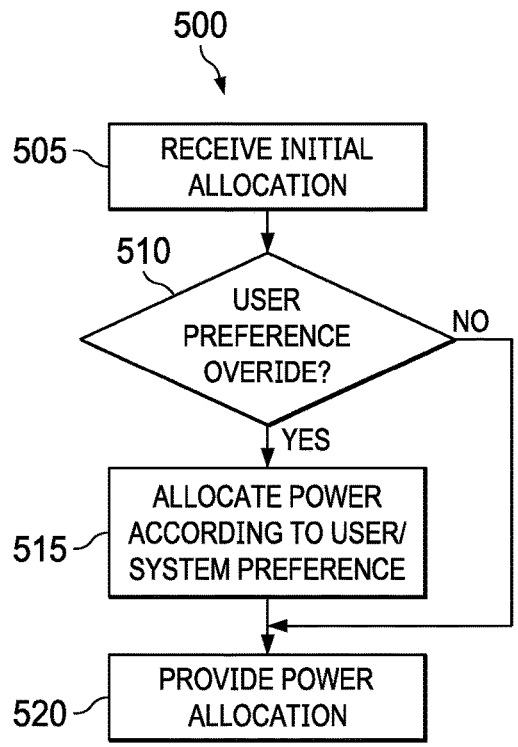
FIG. 5 is an illustration of a method for evaluating user or system preferences that may otherwise override power balancing of a shared power allocation, according to embodiments of the present disclosure.

FIG. 5 is an illustration of a method 500 for evaluating user or system preferences that may otherwise override power balancing of a shared power allocation, according to embodiments of the present disclosure. Method 500 may implement, fully or in part, step 315 from FIG. 3. Method 500 may be performed by any suitable portion of system 100, such as LTBB 122, USB dock 102, or USB hub 104. Method 500 may be performed by analog circuitry, digital circuitry, instructions for execution by a processor, or any suitable combination thereof. Although illustrated with a certain number of steps, method 500 may be performed with more or fewer steps. Moreover, although illustrated in a certain order, the steps of method 500 may be performed in any suitable order. One or more steps of method 500 may be omitted, repeated, or performed in parallel or recursively. Method 500 may begin or end at any suitable step, and may repeat.

At 505, an initial shared power allocation may be received. This allocation may be received from, for example, the end of method 400. In another example, the allocation may be received from methods 600 or 700, discussed in more detail below. In such an example, after processing by method 500, the allocation may again be evaluated through methods 600 or 700.

At 510, it may be determined whether any user input, user preferences, or system settings override elements of the shared power allocation. Such an override may include, for example, providing more power to a given USB element connected to an identified USB port, providing a minimum amount of power to an identified type of USB elements such as a smartphone, setting a given USB element into a lower-power mode, or any other suitable modification to the shared power allocation. If an override is to be performed, method 500 may proceed to step 515. Otherwise, method 500 may proceed to step 520.

At step 515, the override may be applied so as to modify the shared power allocation. At step 520, the shared power allocation, as-modified (if any) by method 500, may be made available for other methods.

Figure 6:
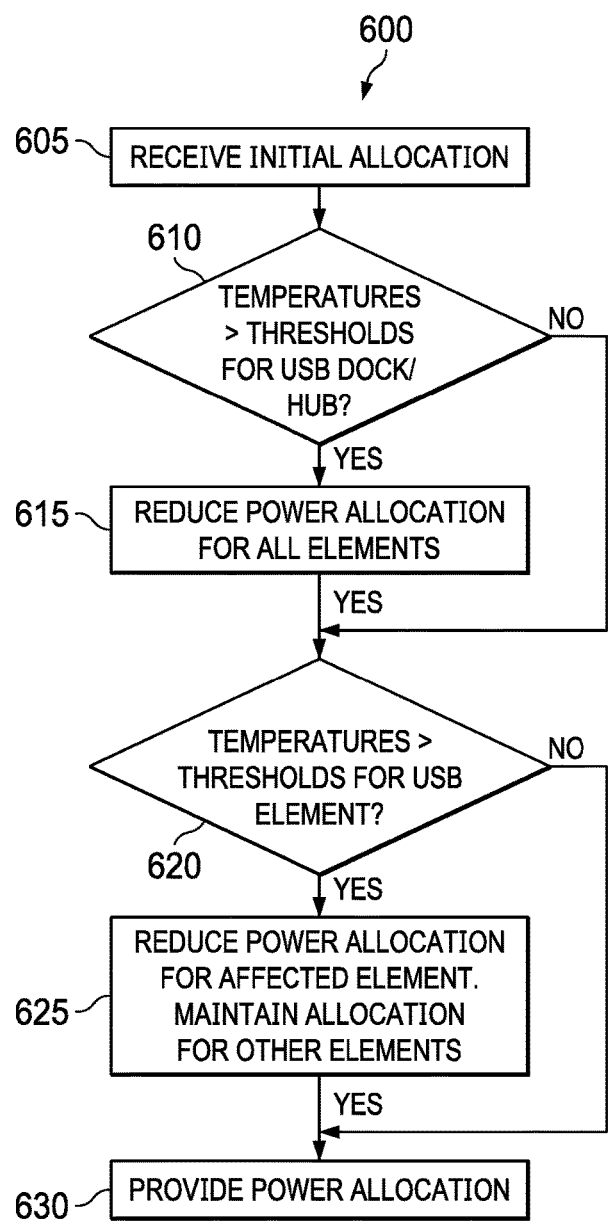
FIG. 6 is an illustration of a method for performing thermal power balancing, according to embodiments of the present disclosure.

FIG. 6 is an illustration of a method 600 for performing thermal power balancing, according to embodiments of the present disclosure. Method 600 may implement, fully or in part, step 320 from FIG. 3. Method 600 may be performed by any suitable portion of system 100, such as LTBB 122, USB dock 102, or USB hub 104. Method 600 may be performed by analog circuitry, digital circuitry, instructions for execution by a processor, or any suitable combination thereof. Although illustrated with a certain number of steps, method 600 may be performed with more or fewer steps. Moreover, although illustrated in a certain order, the steps of method 600 may be performed in any suitable order. One or more steps of method 600 may be omitted, repeated, or performed in parallel or recursively. Method 600 may begin or end at any suitable step, and may repeat.

At step 605, an initial allocation may be received. The allocation may be received, for example, from performance of methods 400 or 500.

At step 610, it may be determined whether temperatures of the USB dock or USB hub are above one or more thresholds. If so, method 600 may proceed to step 615. Otherwise, method 600 may proceed to step 620.

Figure 7:
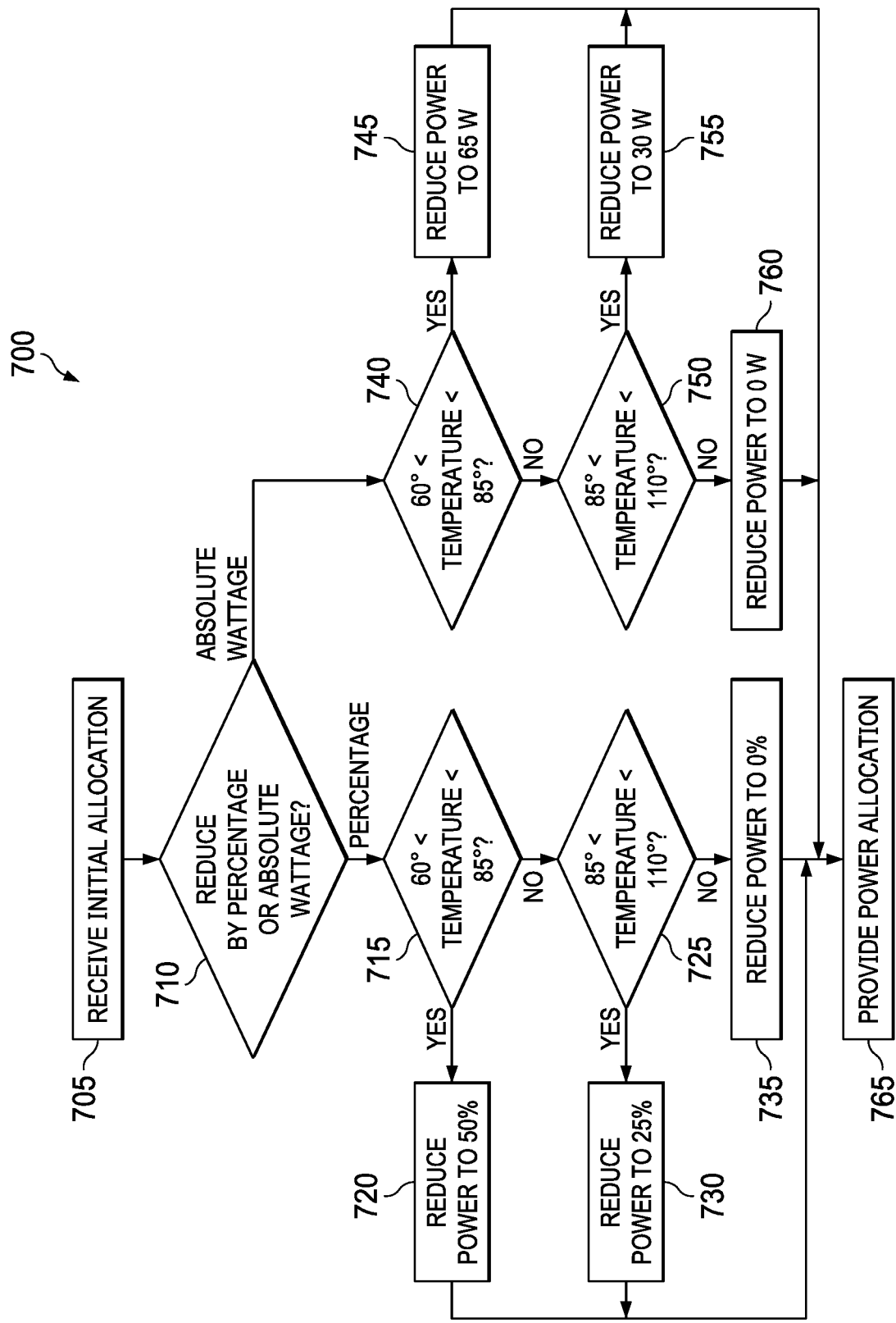
FIG. 7 is an illustration of a method for applying particular thresholds to temperature measurements as part of performing thermal power balancing, according to embodiments of the present disclosure.

At step 615, power allocation may be reduced for all elements connected to the USB dock or USB hub. This reduction may supersede other, lesser allocation restrictions for temperature performed for individual elements connected thereto. Any suitable reduction, using any suitable thresholds, may be used. A more detailed example of such reduction and thresholds are illustrated in FIG. 7, discussed below. Method 600 may proceed to step 620.

At step 620, it may be determined whether temperatures of any given USB element or ports connected thereto are above one or more thresholds. If so, method 600 may proceed to step 625 for each such given USB element with temperatures above the one or more thresholds. Otherwise, method 600 may proceed to step 630.

At step 630, power allocation may be each USB element identified in step 620 as having a temperature above the one or more thresholds. This reduction may be greater than one applied to all elements by step 615, if the given USB element has a temperature above a higher threshold than evaluated in step 615. Any suitable reduction, using any suitable thresholds, may be used. A more detailed example of such reduction and thresholds are illustrated in FIG. 7, discussed below. Method 600 may proceed to step 630.

At step 630, the shared power allocation, as-modified (if any) by method 600, may be made available for other methods.

FIG. 7 is an illustration of a method 700 for applying particular thresholds to temperature measurements as part of performing thermal power balancing, according to embodiments of the present disclosure. Method 700 may implement, fully or in part, steps 615 or 625 from FIG. 6. Method 700 may be performed by any suitable portion of system 100, such as LTBB 122, USB dock 102, or USB hub 104. Method 700 may be performed by analog circuitry, digital circuitry, instructions for execution by a processor, or any suitable combination thereof. Although illustrated with a certain number of steps, method 700 may be performed with more or fewer steps. Moreover, although illustrated in a certain order, the steps of method 700 may be performed in any suitable order. One or more steps of method 700 may be omitted, repeated, or performed in parallel or recursively. Method 700 may begin or end at any suitable step, and may repeat.

At step 705, an initial shared power allocation may be received. The allocation may be received as it existed, for example, at steps 615 or 625.

At step 710, it may be determined whether the power allocation for the relevant USB element or elements is to be reduced in terms of an absolute wattage or by a percentage. If the power allocation is to be reduced by a percentage, then method 700 may proceed to step 715. Otherwise, method 700 may proceed to step 740.

In step 715, it may be determined whether the temperature for the relevant USB element or elements is within a first range. The range may be, for example, between 60° and 85°. If so, at step 720, power may be reduced to 50%. Method 700 may then proceed to step 765. Otherwise, if the temperature is not within this range, method 700 may proceed to 725.

In step 725, it may be determined whether the temperature for the relevant USB element or elements is within a second range. The range may be, for example, between 85° and 110°. If so, at step 730, power may be reduced to 25%. Method 700 may then proceed to step 765. Otherwise, if the temperature is not within this range, method 700 may proceed to 735.

At step 735, as temperatures were above a given threshold as identified in method 600 and are not within the above ranges, it may be determined that the temperature for the relevant USB element or elements is above the second range. For example, it may be determined that the relevant USB element or elements is above 110°. The power allocation for the relevant USB element or elements may be reduced to 0%. Method 700 may proceed to step 765.

At step 740, it may be determined whether the temperature for the relevant USB element or elements is within a first range. The range may be, for example, between 60° and 85°. If so, at step 745, power may be reduced to a maximum of 65 W. Method 700 may then proceed to step 765. Otherwise, if the temperature is not within this range, method 700 may proceed to 750.

At step 750, it may be determined whether the temperature for the relevant USB element or elements is within a second range. The range may be, for example, between 85° and 110°. If so, at step 750, power may be reduced to a maximum if 30 W. Method 700 may then proceed to step 765. Otherwise, if the temperature is not within this range, method 700 may proceed to 760.

At step 760, it may be determined that the temperature for the relevant USB element or elements is above the second range. For example, it may be determined that the relevant USB element or elements is above 110°. The power allocation for the relevant USB element or elements may be reduced to 0 W. Method 700 may proceed to step 765.

At step 765, the shared power allocation, as-modified by method 700, may be made available for other methods.

Methods 300, 400, 500, 600, 700 may be performed in any suitable order.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

What is claimed is:
1. An apparatus, comprising:
 a plurality of universal serial bus (USB) ports, each configured to connect to a respective USB element;
 a circuit communicatively coupled to the USB ports and configured to:

determine a first temperature measurement in the apparatus, wherein the first temperature measurement is one of the plurality of USB ports connected to a first USB element;

determine a second temperature measurement in the apparatus, the second temperature measurement of a USB hub including the USB ports, the second temperature measurement to be taken in a different location than the first measurement;

determine a power demand for each USB element connected to the USB ports;

determine an initial allocation of power for each USB element based upon an aggregate power demand of all of the USB elements connected to the USB ports;

modify the initial allocation of power to yield the first allocation of power to reduce the initial allocation of power for all the USB elements based upon the first temperature measurement of the USB port, the second temperature measurement of the USB hub, and a determination that the second temperature measurement is higher than the first temperature measurement;

and based on the first allocation of power, provide less than the power demand for at least one or more of the USB elements based upon the aggregate power demand by the USB elements and the first temperature measurement.

2. The apparatus of claim 1, wherein the circuit is further configured to modify the initial allocation of power to yield a second allocation of power to reduce the initial allocation of power for all of the USB elements based upon the second temperature measurement of the USB hub.

3. The apparatus of claim 1, wherein the circuit is further configured to:

modify the initial allocation of power to yield a third allocation of power to reduce the initial allocation of power for the first USB element based upon the first temperature measurement of the USB port; and contemporaneously with a reduction of the initial allocation of power for the first USB element based upon the first temperature measurement of the USB port, maintain the initial allocation of power in the third allocation of power for other USB elements connected to the USB ports.

4. The apparatus of claim 1, wherein the circuit is further configured to modify the initial allocation of power to yield the first allocation of power to, based upon the first temperature measurement of the USB port, the second temperature measurement of the USB hub, and a determination that the second temperature measurement is lower than the first temperature measurement:

reduce the initial allocation of power for all the USB elements; and further reduce the initial allocation of power for the first USB element.

5. The apparatus of claim 1, wherein the circuit is further configured to:

receive user input to provide charging to a first USB element at a level sufficient to charge the first USB element; and modify the first allocation of power to yield a second allocation of power to increase an allocation of power for the first USB element, the second allocation of power for the first USB element including more power than an advertised power availability of the apparatus.

6. An article of manufacture, comprising a non-transitory machine-readable medium, the medium including instructions, the instructions, when loaded and executed by a processor, configure the processor to:

determine a first temperature measurement in an apparatus, the apparatus including a plurality of universal serial bus (USB) ports, each configured to connect to a respective USB element;

determine a second temperature measurement of the apparatus, wherein the first temperature measurement is of a USB port connected to a first USB element, the second temperature measurement is of a USB hub including the USB ports, and the second temperature measurement is to be taken in a different location than the first temperature measurement;

determine a power demand for each USB element connected to the USB ports;

determine an initial allocation of power for each USB element based upon an aggregate power demand of all of the USB elements connected to the USB ports;

modify the initial allocation of power to yield the first allocation of power to reduce the initial allocation of power for all the USB elements based upon the first temperature measurement of the USB port, the second temperature measurement of the USB hub, and a determination that the second temperature measurement is higher than the first temperature measurement;

and based on the first allocation of power, provide less than the power demand for one or more of the USB elements based upon a total power demand by the USB elements and the first temperature measurement.

7. The article of claim 6, further comprising instructions configured to cause the processor to modify the initial allocation of power to yield a second allocation of power to reduce the initial allocation of power for all of the USB elements based upon the second temperature measurement of the USB hub.

8. The article of claim 6 further comprising instructions configured to cause the processor to:

modify the initial allocation of power to yield a third allocation of power to reduce the initial allocation of power for the first USB element based upon the first temperature measurement of the USB port; and contemporaneously with a reduction of the initial allocation of power for the first USB element based upon the first temperature measurement of the USB port, maintain the initial allocation of power in the third allocation of power for other USB elements connected to the USB ports.

9. The article of claim 6, further comprising instructions configured to cause the processor to:

modify the initial allocation of power to yield the first allocation of power to, based upon the first temperature measurement of the USB port, the second temperature measurement of the USB hub, and a determination that the second temperature measurement is lower than the first temperature measurement:

reduce the initial allocation of power for all the USB elements; and further reduce the initial allocation of power for the first USB element.

10. The article of claim 6, further comprising instructions configured to cause the processor to:

receive user input to provide charging to a first USB element at a level sufficient to charge the first USB element; and modify the first allocation of power to yield a second allocation of power to increase an allocation of power for the first USB element, the second allocation of power for the first USB element including more power than an advertised power availability of the apparatus.

11. A method, comprising:

determining a first temperature measurement in an apparatus, the apparatus including a plurality of universal serial bus (USB) ports, each configured to connect to a respective USB element;

determining a second temperature measurement of the apparatus, the first temperature measurement of a USB port connected to a first USB element, the second temperature measurement of a USB hub including the USB ports, and the second temperature measurement to be taken in a different location than the first temperature measurement;

determining a power demand for each USB element connected to the USB ports;

determining an initial allocation of power for each USB element based upon an aggregate power demand of all of the USB elements connected to the USB ports; and modifying the initial allocation of power to yield the first allocation of power to reduce the initial allocation of power for all the USB elements based upon the first temperature measurement of the USB port, the second temperature measurement of the USB hub, and a determination that the second temperature measurement is higher than the first temperature measurement; and based on the first allocation of power, providing less than the power demand for one or more of the USB elements based upon a total power demand by the USB elements and the first temperature measurement.

12. The method of claim 11, further comprising modifying the initial allocation of power to yield a second allocation of power to reduce the initial allocation of power for all of the USB elements based upon the second temperature measurement of the USB hub.

13. The method of claim 11, further comprising:

modifying the initial allocation of power to yield a third allocation of power to reduce the initial allocation of power for the first USB element based upon the first temperature measurement of the USB port; and contemporaneously with a reduction of the initial allocation of power for the first USB element based upon the first temperature measurement of the USB port, maintaining the initial allocation of power in the third allocation of power for other USB elements connected to the USB ports.

14. The method of claim 11, further comprising modifying the initial allocation of power to yield the first allocation of power to, based upon the first temperature measurement of the USB port, the second temperature measurement of the USB hub, and a determination that the second temperature measurement is lower than the first temperature measurement:

reduce the initial allocation of power for all the USB elements; and further reduce the initial allocation of power for the first USB element.

\* \* \* \* \*